US012749607B2

(12) United States Patent
Johnson et al.

(10) Patent No.: US 12,749,607 B2
(45) Date of Patent: Sep. 29, 2026

(54) APPARATUS AND METHODS FOR GENERATING FORCE IN ELECTROMAGNETIC SYSTEMS

(71) Applicant: Thomas Alexander Johnson, Evergreen, CO (US)

(72) Inventors: Thomas Alexander Johnson, Evergreen, CO (US); Gary C. Berkowitz, Centennial, CO (US)

(73) Assignee: Thomas Alexander Johnson, Evergreen, CO (US)

( * ) Notice: Subject to any disclaimer, the term of this patent is extended or adjusted under 35 U.S.C. 154(b) by 128 days.

(21) Appl. No.: 18/502,465

(22) Filed: Nov. 6, 2023

(65) Prior Publication Data

US 2024/0071670 A1 Feb. 29, 2024

Related U.S. Application Data

(63) Continuation of application No. PCT/US2022/028073, filed on May 6, 2022.

(60) Provisional application No. 63/184,948, filed on May 6, 2021.

(51) Int. Cl.
*H01F 7/16* (2006.01)
*H01F 7/08* (2006.01)

(52) U.S. Cl.
CPC ........... *H01F 7/1607* (2013.01); *H01F 7/081* (2013.01)

(58) Field of Classification Search
CPC ................... H01F 7/1607; H01F 7/081; H01F 2007/1692; H01F 7/064; H01F 7/14; H01F 7/122; H01F 7/1615; H02K 17/02; H02K 49/102; H02K 41/031; F16F 6/00; H05H 1/2439
USPC .......................................................... 335/255
See application file for complete search history.

(56) References Cited

U.S. PATENT DOCUMENTS 341,981 A 5/1886 Woolson
2,749,453 A * 6/1956 Cassell .................. G10K 1/064 335/229
2,829,319 A * 4/1958 Mccleskey ............ H01F 7/1615 335/258

(Continued)

FOREIGN PATENT DOCUMENTS

CA 2341095 10/2001
JP 2004-050154 2/2004

(Continued)

OTHER PUBLICATIONS

International Search Report and Written Opinion dated Oct. 12, 2022, from International Patent Application No. PCT/US2022/028073, 15 pp.

(Continued)

*Primary Examiner* — Shawki S Ismail
*Assistant Examiner* — Lisa N Homza
(74) *Attorney, Agent, or Firm* — Klarquist Sparkman, LLP

(57) ABSTRACT

Apparatus, systems, and methods of construction and use to produce linear, rotational or counter-rotational motion, acceleration, and actuation by the use of moveable ferromagnetic, electromagnetic, conductive, or permanent magnetic objects. The moveable objects are oriented to produce or to be acted upon by asymmetric electromagnetic field distributions, thereby resulting in motion of the magnetic objects. Further, exemplary embodiments and applications are described herein.

14 Claims, 10 Drawing Sheets

(56) References Cited

U.S. PATENT DOCUMENTS

| | | | | | |
|---|---|---|---|---|---|
| 4,235,153 | A * | 11/1980 | Rinde | H01F 7/13 | 91/1 |
| 4,295,066 | A * | 10/1981 | Lloyd | H01F 7/1615 | 310/35 |
| 4,422,060 | A * | 12/1983 | Matsumoto | H01F 7/13 | 335/266 |
| 4,808,079 | A * | 2/1989 | Crowley | F04B 17/00 | 310/11 |
| 4,994,776 | A * | 2/1991 | Juncu | H01F 7/1615 | 335/85 |
| 5,026,681 | A * | 6/1991 | Hed | H02K 44/02 | 505/165 |
| 5,814,907 | A * | 9/1998 | Bandera | H01F 7/1615 | 310/23 |
| 6,639,496 | B1 * | 10/2003 | van Namen | H01F 7/1615 | 335/229 |
| 7,468,644 | B2 * | 12/2008 | Axel | G01R 33/385 | 333/219 |
| 2004/0129322 | A1 | 7/2004 | Chen | | |
| 2004/0187294 | A1 * | 9/2004 | Inaishi | H02K 3/505 | 29/598 |
| 2006/0103384 | A1 * | 5/2006 | Matsumoto | G01R 33/3815 | 324/318 |
| 2006/0197167 | A1 | 9/2006 | Dooley | | |
| 2007/0194636 | A1 * | 8/2007 | Ohashi | H10N 35/00 | 310/26 |
| 2008/0079520 | A1 * | 4/2008 | Vranish | H01F 7/1615 | 200/50.01 |
| 2009/0108129 | A1 | 4/2009 | Flatt | | |
| 2009/0189464 | A1 * | 7/2009 | Schilffarth | B01L 3/502761 | 310/12.04 |
| 2010/0007223 | A1 * | 1/2010 | Denne | H02K 3/26 | 310/179 |
| 2010/0060393 | A1 * | 3/2010 | Joo | H01H 33/38 | 335/180 |
| 2013/0135762 | A1 | 5/2013 | Lee et al. | | |
| 2013/0241675 | A1 | 9/2013 | Simonin | | |
| 2020/0050115 | A1 * | 2/2020 | Duijsens | G03F 7/70758 | |
| 2022/0109361 | A1 * | 4/2022 | Johnson | H02K 33/18 | |

FOREIGN PATENT DOCUMENTS

| | | | | |
|---|---|---|---|---|
| KR | 20080094892 | | 10/2008 | |
| WO | WO 97/29536 | | 8/1997 | |
| WO | WO 02/27902 | | 4/2002 | |
| WO | WO 2005/088805 | | 9/2005 | |
| WO | WO 2009/140750 | | 11/2009 | |
| WO | WO-2013085231 | A1 * | 6/2013 | H02K 21/46 |
| WO | WO 2021/086470 | | 5/2021 | |
| WO | WO 2022/072871 | | 4/2022 | |

OTHER PUBLICATIONS

Extended European Search Report dated Apr. 23, 2025, from European Patent Application No. 25154505.9, 10 pp.
Hiemstra, "Design of Moving Magnet Actuators for Large-range Flexure-based Nanopositioning," downloaded from https://www.researchgate.net/publication/325594071, 318 pp. (Jul. 2014).
International Preliminary Report on Patentability dated Apr. 13, 2023, from International Patent Application No. PCT/US2021/053228, 7 pp.
International Search Report and Written Opinion dated Jan. 27, 2022, from International Patent Application No. PCT/US2021/053228, 10 pp.
Janssen, "Making a Coilgun—Part 3: Reconsidering Everything," YouTube Video downloaded from https://youtu.be/Dzulys5DEaw, 5 pp. (video posted Feb. 23, 2020).
JClaw Tek, "V-gate with Magnetic Neutralization—Final Version," YouTube Video downloaded from https://www.youtube.com/watch?y+YFu6qNX9C1k, 5 pp. (video posted May 8, 2020).
Notice of Preliminary Rejection dated Aug. 19, 2025, from Korean Patent Application No. 10-2023-7014988, 7 pp.
Squatchy, "Multi-coil solenoids . . . How would they work?" downloaded from https://forum.allaboutcircuits.com/threads/multi-coil-solenoids-how-would-they-work.78760/, 1 p. (document marked Dec. 26, 2012).
Supplementary European Search Report dated Jul. 9, 2024, from European Patent Application No. 21876620.2, 10 pp.
Wikipedia, "Zeeman slower," pp. 1-3, downloaded from https://en.wikipedia.org/wiki/Zeeman_slower, on Jan. 12, 2022.

* cited by examiner

APPARATUS AND METHODS FOR GENERATING FORCE IN ELECTROMAGNETIC SYSTEMS

CROSS REFERENCE TO RELATED APPLICATION

This application is a U.S. bypass continuation of International Application No. PCT/US2022/028073, filed May 6, 2022, which in turn claims the benefit of U.S. Provisional Patent Application No. 63/184,948, filed on May 6, 2021, which are each incorporated by reference herein in their entirety.

FIELD

The present disclosure is generally directed to electromagnetic machines, and more specifically to electromagnetic actuators or motors, plasma actuators, magnetic braking systems, and magnetic gear systems, as well as associated apparatus, systems, and methods.

BACKGROUND

In a general electromagnetic force-generating system, a current-carrying conductor, which by Oersted's Law generates a magnetic field (given by Biot-Savart), interacts with an external magnetic field, and thus-a force on both the conductor and a source of the external magnetic field is generated. According to well established laws of electrodynamics, this interaction, when asymmetric, can produce motion of an object.

For example, in a common solenoid device, a rigid magnetic or ferromagnetic (non-permanent) object, commonly termed a "plunger" or a "core" or an "armature" (which is distinct from the use of "armature" in electrical technology, meaning a framework of coil windings), is suspended near or partly within a cylindrical current-carrying solenoid (which may also be referred to as a coil). The application of current in the coil generates a magnetic force that propels the object along the axis of the coil in a manner that pulls the plunger toward the midpoint of the coil. In this example, the force experienced by the plunger is dependent on the position of the plunger along the axis of the solenoid magnetic field. Thus, the maximum force on the plunger occurs when one end of the plunger is at the endpoint of the coil. Further, the equilibrium point of zero net force occurs when the midpoint of the plunger aligns with the midpoint of the coil because an equal and opposite magnetic forces acts on the N and S ends of the plunger concurrently. When a non-magnetic extension of the plunger is used to cause an action to take place outside the end of solenoid, the system is commonly referred to as a proportional, axial, or linear actuator. The range of motion defines a stroke of the solenoid linear actuator with a maximum range of motion being limited to one-half the length of the coil.

SUMMARY

In a first aspect, electromechanical system is disclosed. In examples, the system includes a first coil comprising a first set of windings; a second coil comprising a second set of windings, the second coil arranged on an axis with the first coil, the first set of windings and the second set of windings circumscribing the axis; and a plunger configured for movement along the axis; wherein the first coil is configured to receive power from a first power source, and the second coil is configured to receive power from a second power source; and wherein the electromechanical system is configured such that supplying a greater amount a power to one of the first coil or the second coil relative to the other of the first coil or the second coil results in generation of an asymmetrical flux distribution along the axis.

In another aspect, a magnetic spring-like system is disclosed. In examples, the system includes a shaft having one or more magnetic plungers disposed therein; a first linear actuator arranged on an axis with the shaft, the first linear actuator configured to produce a force in a first direction along the axis; and a second linear actuator arranged on the axis with the first linear actuator and the shaft, the second linear actuator configured to produce force in a second direction along the axis, the second direction opposing the first direction.

In another aspect, a magnet system configured for use in a linear actuator is disclosed. In examples, the system includes a conical magnetic body; and a cylindrical housing, the conical magnetic body disposed within the cylindrical housing; wherein the conical magnetic body is configured to produce an asymmetrical magnetic field.

In yet another aspect, a rotational actuator is disclosed. In examples, the rotational actuator includes a rotating object; a first pyramidal-shaped magnet embedded in the rotating object; a linear track; and a second pyramidal-shaped magnet embedded in the linear track; wherein movement of one of the linear track or the rotating object is configured to cause corresponding movement in the other of the linear track or the rotating object due to interaction of the first pyramidal-shaped magnet and the second pyramidal-shaped magnet.

The foregoing and other aspects, objects, features, examples, and advantages of the invention will become more apparent from the following detailed description, which proceeds with reference to the accompanying figures.

DETAILED DESCRIPTION

General Considerations

Figure 1:
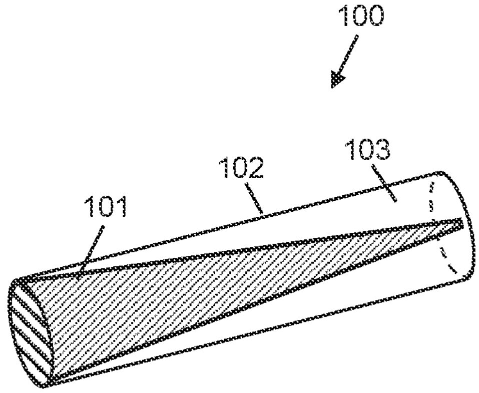
FIG. 1 is a schematic illustration of an exemplary permanent magnet configured to provide a non-linear distribution of magnetic flux density to an actuator according to the present disclosure.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application, the singular forms "a," "an," and "the" include the plural forms unless the context clearly dictates otherwise. Additionally, the term "includes" means "comprises." Further, the terms "coupled" or "secured" encompass mechanical and chemical couplings, as well as other practical ways of coupling or linking items together, and do not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, this manner of description encompasses rearrangement, unless a particular ordering is required by specific language set forth below. For example, operations described sequentially may in some cases be rearranged or performed concurrently. Moreover, for the sake of simplicity, the attached figures may not depict the various ways in which the disclosed things and methods can be used in conjunction with other things and methods. Additionally, the description sometimes uses terms like "provide" and "produce" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the terms "attached" and "coupled" generally mean physically connected, which includes items that are directly attached/coupled and items that are attached/coupled with intermediate elements between the attached/coupled items, unless specifically stated to the contrary.

As used herein, the terms "non-linear field gradient" and "inhomogeneous field gradient" refer to the modification of the profile of a magnetic field in such a way that objects which are immersed in the magnetic field lines of an object experience force from nearby sources of magnetic field lines which are of greater or weaker magnetic flux density unless specifically stated to the contrary.

As used herein, the terms "fixedly attached" and "fixedly coupled" refer to two components joined in a manner such that the components may not be readily separated from one another without destroying and/or damaging one or both components. Exemplary modalities of fixed attachment may include joining with permanent adhesive, stitches, welding or other thermal bonding, and/or other joining techniques. In addition, two components may be "fixedly attached" or "fixedly coupled" by virtue of being integrally formed, for example, in a molding process. In contrast, the terms "removably attached" or "removably coupled" refer to two components joined in a manner such that the components can be readily separated from one another to return to their separate, discrete forms without destroying and/or damaging either component. Exemplary modalities of temporary attachment may include mating-type connections, releasable fasteners, removable stitches, and/or other temporary joining techniques.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, abstract, and drawings.

Overview

In existing solenoid linear actuators, the net magnetic force that acts on the object (plunger) in motion, which is typically a ferromagnetic rod or a permanent magnet, is generally linear along the entire stroke except at the opposing ends of the coil. Thus, as noted above, the maximum stroke is limited to half the coil length. However, linear forces are not always ideal in linear actuator applications. Thus, there is a continuing need for improved linear actuators, including those configured to provide nonlinear forces, and especially those configured for a longer stroke for the same coil length.

Disclosed herein are apparatus and methods for generating nonlinear force in electromagnetic actuator systems. The apparatus and methods disclosed herein can be configured with one or more coils arranged to provide a nonuniform (asymmetric) field distribution, yielding a longer stroke than previously achievable with known solenoid linear actuators. In examples, the disclosed apparatus and methods are directed to linear actuators. In examples, the linear actuators can be configured to provide nonlinear acceleration.

Such linear actuators (as the examples described herein) can be used in various applications. For example, the disclosed technology can be used for high-performance, long-stroke linear, and/or rotational actuators. In another example, the disclosed linear actuators can also be used when an application involves either crushing or stretching a target. Often, the forces on the object may be better suited if they are not linear in these applications, as the force required to crush or stretch an object can change over the length of the stroke (i.e., the required force is nonlinear). As yet another example, it may be advantageous to have non-linear acceleration in applications where the smooth transition of speed of the object in motion is desired, such as, e.g., in accelerating a passenger train or a car.

In exemplary linear actuators, after being inserted axially into a current-carrying coil, a ferromagnetic object will experience a force, which can project the ferromagnetic object toward the center of the coil where the forces on the moving ferromagnetic object from each of the poles find equilibrium. It will be appreciated that in conventional linear actuators shorter coils possess a shorter distance to the midpoint than do larger coils, so the stroke is shorter in a shorter coil relative to a larger coil.

In exemplary linear actuators disclosed herein, to increase the stroke without increasing the length of a coil, the linear actuator can comprise a shorter (e.g., slightly shorter) secondary winding disposed on the outside and towards one end of a primary coil. In other examples, linear actuators can comprise linearly arranged coils on separate circuits that can be supplied different amounts power. In examples, one or more additional shorter coils, such as a series of shorter and shorter coils of increasing radius added to or disposed on the periphery of a solenoid and displaced or offset toward one end thereof, the equilibrium point can be displaced further towards one pole of the primary (innermost) solenoid coil. In other examples, a linear actuator can include a series of coils each having a progressively greater number of windings than a prior coil in the series. In additional or alternative examples, a magnet in an actuator can have a tapered, conical, wedge, pyramid, or curved wedge shape that creates a variation in thickness of the magnet.

A ferromagnetic object can be moved to a slightly displaced position from the center of the coil as the object is brought to equilibrium within the primary and secondary coils acting on it. The ferromagnetic object therefore can be displaced past the center of the coil, toward the end with the actuator. In examples, there may be a limit to how close the equilibrium and/or the ferromagnetic object can move or shift toward one pole based on e.g., geometry of the coils. The objective, however, can be that an object using these exemplary systems can attain a much longer range of actuation as compared to known solenoid coil winding geometry. Thus, one exemplary objective of the linear actuators disclosed herein is to generate a longer stroke than previously achievable with a single-coil solenoid actuator of the same length.

In effect, the asymmetric coil geometry (and/or the asymmetrical magnet geometry) can create a non-linear magnetic field density along the solenoid, which preponderates towards one end thereof, thus enabling an increased range of motion. Using such systems, it may be possible for a magnetic object in motion in a linear actuator to experience a force that propels the magnetic object along the nearly entire length of the coil before it reaches the point at which opposing forces begin to bring the magnetic object to rest (equilibrium). Using multiple coils with differing levels of current such that the force preponderates from one coil to the next can be an alternative way of achieving this effect. In examples, so long as the magnetic field distribution is nonuniform, the length of the stroke can be increased over that of a comparable conventional coil possessing a uniform magnetic field distribution. In examples, there can be mechanical stops in the actuator to stop the plunger from going past the limits of the plunger's stroke, so as to be able to reverse the polarity supplied to the solenoid, thereby reversing the direction of forces on a plunger, which may be, for example, a permanent magnet that is magnetized throughout its length.

These and other features, aspects, and/or advantages of the present disclosure will become better understood with reference to the following detailed description, the drawings, and the claims.

Examples of the Disclosed Technology

In examples, the disclosed technology comprises one or more linear actuators or linear motors in which there exists a non-homogenous magnetic field acting on another magnetic field. A moving object (plunger) in such a system tends to accelerate towards or away from the point of the highest magnetic flux density. In examples, a coil may be constructed to have a number of windings increased along the length of the coil in order to achieve this distribution. In other examples, several coils may also be placed side by side which have different power flow supplied to each of their terminals in such a way that the magnetic flux gradient points towards or away from the desired motion. Further, in examples; permanent magnets can also be constructed which have a magnetic field gradient built into them, either through their geometry and thickness and/or through materials incorporated therein. Such magnets can be used as objects or plungers within the disclosed asymmetrical coil arrangements, side-by-side coil arrangements or other configurations for linear actuators (e.g., conventional linear actuators).

FIG. 1 illustrates a magnet system 100 including a permanent magnet 101 which has a long conical shape and is configured to have a built-in magnetic gradient. This conical shape is made to fit within a cylindrical profile 102, which may be an actuator or a housing. The conical magnet may have a non-magnetic material that fills up part or all of the void left between the magnet 101 and the cylindrical profile 102 so as to enable smooth operation without any twisting or misalignment of the magnet 101 during use. Permanent magnets may also be combined having different materials, number, and/or spacing to create a non-homogenous field, and such magnets may be ideal to use in systems of force where the non-linearity of the field may act to extend the range of actuation of the moving object (or stoke length) in the system relative to the actuation range which would otherwise be accomplished by a standard symmetric permanent magnet.

Additionally or alternatively, electromagnetic coils can be used which incorporate different spacing to achieve a similar effect. For example, combinations of the above methods of producing non-homogenous magnetic fields can be used in conjunction with one another to achieve an extension of the stroke or motion in a system. In some examples (e.g., where high precision of movement is deemed advantageous), two or more coils can be used which have different polarity (either through the winding direction or the direction of current flow) along the same axis of motion such that they create oppositely directed forces along a non-homogenous magnetic field core. In such examples, variations in the supplied power would allow for one coil to create stronger forces than another and create forces in the system in one direction. This can enable for extremely precise movements of an object in the system to be created or controlled when a computer-controlled power flow is used and a precise method of position tracking is employed in conjunction with the computerized system.

In examples, increased spacing between these coils of opposite polarity may be used (in one or more instances) so that the two magnetic fields do not interfere with one another to the same degree. In such examples, tension can be generated or formed in the structure where two coils are mounted when they are pulled in opposite directions due to their opposite action on the permanent magnet. If the two coils acting oppositely are in equilibrium, the balanced forces amidst a non-homogenous magnetic field can cause the permanent magnet to act like a magnetic spring which is biased to return to its point of equilibrium. Inversely, tension or motion created in such a system may induce currents in the coils. A system which generates power from a coil situated near a non-homogenous magnetic field may be advantageous, for example, when there exists different levels of force along a direction of movement as the back electromagnetic field ("EMF") which resists the movement of the generating coil will resist motion proportionally to the magnetic field density.

Figure 2:
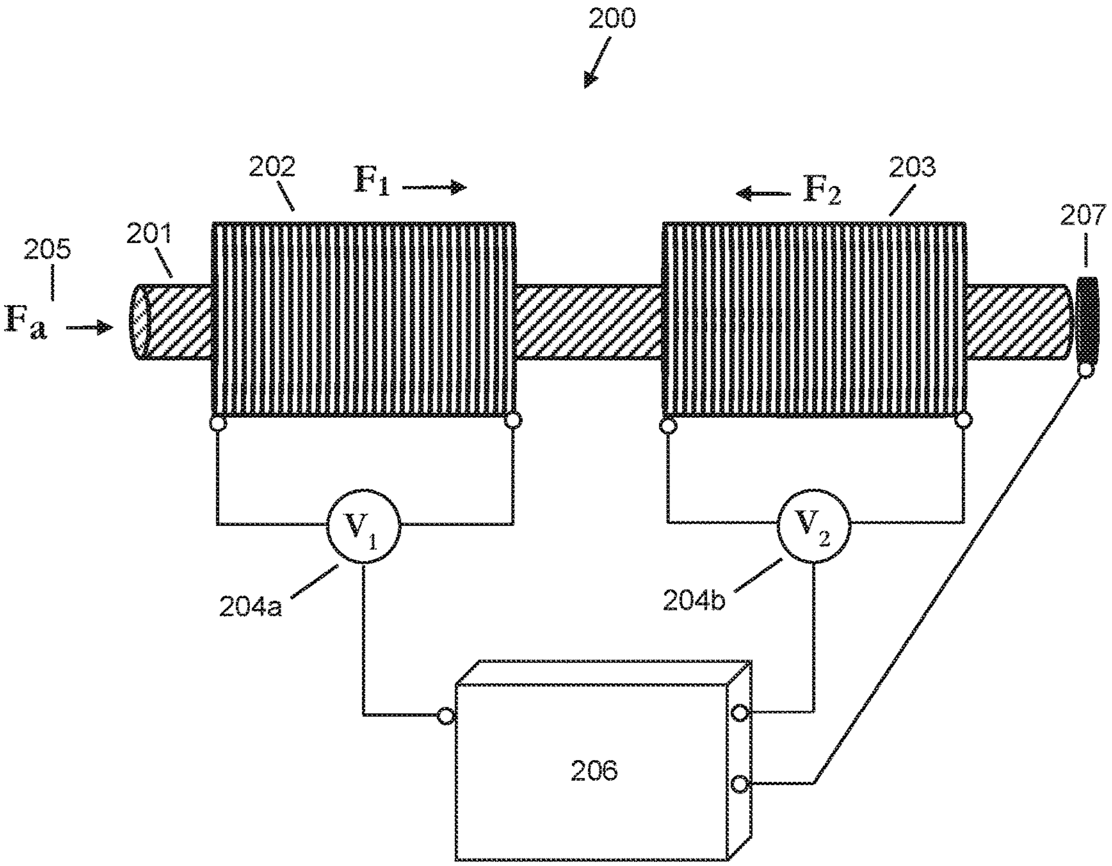
FIG. 2 is a schematic illustration of an exemplary system of motion and/or force dispersion using two actuators which are connected by a common element according to the present disclosure.

In the above embodiment, reference was made to a system with two coils immersed in a non-homogenous magnetic field pulling in opposite directions and that form a spring-like system when their supplied power levels are in equilibrium. With this system, a magnetic spring can be formed, for example, with only permanent magnets, only electromagnetic coils, or a combination of the two. One exemplary magnetic spring system 200 is illustrated in FIG. 2 and discussed further below.

In examples, the non-homogenous magnetic field can be at a minimum in the center of the axis of movement (the point between the two poles) and there can be an equal but opposite polarity magnetic field with peak magnetic flux density at either end of the axis of movement. Two coils or permanent magnets can be rigidly connected together and can have opposite polarity so that they are each attracted and repelled from opposite ends of the axis of movement. The equal magnetic field peak at either end of the axis of travel can allow for the two magnets or coils to have equal and opposite attraction and repulsion forces over the entire length of displacement. This can allow for the system to generate a force vs. displacement curve approximating that of a linear spring (when the magnetic field over the axis approximates a linear function) without the sharp change in the curves slope that occurs when a coil spring unwinds or has the coils touching. In other words, this form of spring can maintain a linear force vs. displacement curve over the entire length of actuation. Such functionality can thereby improve the spatial efficiency of useable displacement by allowing for a more compact spring (without the unnecessary length of a spring which does not function consistently at the ends of its tension or compression) and/or allowing for a more linear curve over the entire length when the size is equal to a comparable physical spring.

In examples where a non-linear force over the length of displacement is desired, a change in one or both of the magnetic fields of the stationary or moving part of the system can be implemented. When electromagnetic coils are employed in one or both parts of the system, this change can be dynamic over a wide range of forces corresponding to the current and the magnetic field density. The magnetic spring can, for example, be adapted to a precise linear actuator which is capable of extremely small changes in position and can form a hybrid between the two where the centering position of the spring can be biased by using the system in linear actuator mode and reducing the power flow to one of the coils thereby creating a preponderant coil. This may be applicable when, for instance, a vehicle equipped with this system is able to alter its ride height quickly equally at all corners or adaptively in the case of being able to lean into a corner by reducing or increasing the ride height of one side of a vehicle as the terrain demands.

In examples, additional coils may be used for dampening and compression adjustments by acting on the magnetic fields in the system to reduce oscillations and provide reluctance to travel. In examples, this action can be active through the use of power. Additionally or alternatively, the action can be passive through the power generation in the coils and the resulting back EMF acting on the motion of the magnetic fields and providing reluctance. Standard systems of mitigating back EMF can also be used for variation of the force, such as opening the terminals of the coil to stop the production of a back EMF when the coil is in passive (generating) mode. In examples, computerized systems and precise distance measuring can be used in conjunction with the system for making the system variable in the power flow to or from the coils in order to make the suspension adaptive. This embodiment, for example, allows for the use of this system to replace an ordinary coil and damper set up, but it can be understood that its uses are not limited to that application.

In examples, the system may be incorporated around an axis of rotation instead of along a straight axis. An example of when this would be advantageous is by attaching this system directly to a vehicle's wishbones where there already exists an axis of rotation, thereby reducing the number of moving components in a suspension system. It can be understood that these examples do not limit the application of the disclosed technology, but rather show instances where it may be deemed useful. For instance, another exemplary application of this technology is when it is paired with a standard spring and damper set up. The linear actuators can be attached to the suspension and can augment the spring constant and the dampening characteristics when it is energized. This type of "hybrid" electro-mechanical setup gives improved reliability through the redundancy of the parts, as well as allowing simple and wide range adjustment to the damper characteristics without significant changes in the manufacturing costs or complexity, and/or allows the car to retain spring suspension when the power is off (as, for instance, would be the case in a situation where the car was parked and the engine and/or motor is/are not running).

FIG. 2 illustrates the system 200, which may function equivalently to a spring and damper system. As shown therein, the system 200 can includes a shaft 201 which contains magnetic plungers (not shown) along its length and has externally applied force(s) 205 imparted to it. The magnetic plungers can be moved within two linear actuators 202 and 203, which produce a non-linear flux density along their lengths. The polarity or orientation of the actuators is such that the actuator 202 produces forces $F_1$ in the opposite direction of forces $F_2$ produced by the actuator 203 during normal operation, which causes the shaft 201 to be held in tension or compression between the two opposing forces ($F_1$ and $F_2$) in the area between the two plungers.

This can enable the system 200 to act like a spring due to the opposing forces ($F_1$ and $F_2$) causing a point of equilibrium which the shaft 201 will return to after a force is applied in the same manner as a spring. In this case, the spring constant can be proportional to the flux density distributions along the actuators 202 and 203, the power supplied to the actuators 202 and 203, as well as the strength of the permanent magnets on the shaft. The power can be supplied through two power sources 204*a* and 204*b*.

The power sources 204*a* and 204*b* may be connected to a computer 206, which is configured to alter the power flow according to the data or signals received from a position feedback sensor 207. By causing one of the power sources 204*a* or 204*b* to deliver more or less power than the other, the center position of the shaft 201 can be displaced. If this is done at the appropriate time, the force that would act to displace the position of the shaft 201 can act as a dampener to movement. Using the position feedback sensor 207, the computer 206 can proactively compensate for oscillations and dampening force, thereby allowing tuning of the compression and rebound forces through the action of the computer in changing the power flow to the respective circuits of the linear actuator 202 and 203.

Another aspect of the disclosed technology is a linear actuator configuration that incorporates one or more non-homogenous magnetic fields along the axis of movement. This exemplary linear actuator configuration can, for example, allow for the object (plunger) to experience a force over a greater variation in distance as compared to a standard linear actuator having similar size of solenoid or magnets. Further, it can allow for multiple objects to travel in the same direction under the influence of the same field or within the same linear actuator. Further still, in a rotational form, multiple objects can be acted on by the magnetic field simultaneously. Yet further, when the plunger of the actuator incorporates a non-linear distribution of magnetic flux density in addition to the solenoid or stationary part of the linear actuator incorporating a non-linear distribution of magnetic flux density, a maximum amount of displacement relative to the size of the linear actuator may be produced.

In examples, both the plunger and the solenoid can be composed of multiple circuits, each possessing a different value of current flow and each connected to a source of electronic power management so as to produce a linear actuator which is capable of performing a wide range of actions. Smaller actions in a linear actuator such as this can be produced, for example, when only small portions of each of the linear actuators is energized. Larger actions can take place, for example, when non-linear distribution of magnetic flux density is created on one or both of the parts of the actuator (i.e., the moving and stationary components).

Another exemplary embodiment of the disclosed technology is application in a plasma actuator, such as the plasma actuator 300 shown in FIG. 3 and discussed further below. A typical plasma actuator is a set of two or more electrodes which have at least one electrode exposed to the fluid medium and one sheathed behind a dielectric barrier in order to cause an acceleration of ionized particles toward the latter. The plasma actuator disclosed herein can enable extension of the length, increase in acceleration of the medium, and/or decrease in the amount of dielectric breakdown in a dielectric barrier discharge in the plasma actuator. In examples, methods through which the dielectric barrier discharge can be increased in length, accelerated to greater velocities, and/or can be made to lessen the breakdown of the dielectric include utilizing application of non-linear voltage distributions on a charged conductor which is sheathed under a dielectric barrier. Plasma actuators (which use a dielectric barrier discharge in order to influence fluid flow of the surrounding medium) can, by this method, extend the influence of the plasma on the fluid medium through the relatively longer length of travel which the lionized plasma is made to be conveyed upon by the introduction of the field asymmetry.

One exemplary method of producing the non-linearity of the field can be through the influence of mutual capacitance of a secondary source of electric potential acting on the sheathed conductor by placing it in close proximity with the conductor. This mutual capacitance can cause a change in the charge distribution along a surface of a conductor and therefore cause a change in the voltage distribution along the conductor. In examples, the secondary source may provide a mutual capacitive influence over a small portion of the surface of the sheathed conductor when it is desirable to cause a change in the voltage distribution only over this small portion of the conductor. In examples, other voltage sources may be employed which may have different voltage levels when it is desired for the dielectric barrier discharge to have a particular or dynamic distribution of the plasma velocity along the discharge axis. It will be appreciated that the mutual capacitance in the system which produces the non-linear field is a function of voltage and surface area, so either of these may be augmented to change the field distribution.

Effectively, this exemplary method can allow for changes in the distribution and density of the electrons at a given spot of the sheathed conductor, which subsequently augments the pressure profile. The pressure profile can therefore be augmentable by augmenting the electric field intensity along the sheathed and insulated conductor. This may be useful in events where the fluid dynamics of an object are optimized by a certain pressure profile of the plasma actuator. The pressure profile of the actuator produced by the electric field distribution at the surface of the dielectric barrier may be dynamic in time, space, or both time and space to suit the application.

Figure 3:
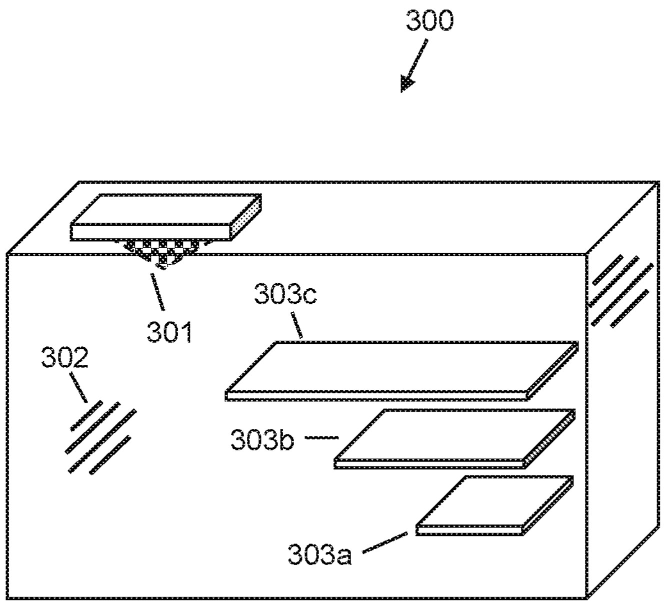
FIG. 3 is a schematic illustration of an exemplary plasma actuator containing a sheathed electrode which is capable of having an asymmetrical charge distribution according to the present disclosure.

FIG. 3 illustrates the exemplary plasma actuator 300 with an extended range of action (relative to that of a conventional plasma actuator) due to the asymmetrical electric field distribution along its surface. As can be seen in FIG. 3, the plasma actuator 300 comprises of an ion emitter 301 which is immersed in a fluid medium. The ion emitter 301 may be an exposed and highly charged conductor. The ions emitted from the ion emitter 301 can be propelled towards an oppositely polarized electrode 303*c* which is sheathed in a dielectric 302. The electrode 303*c* may be acted on by an electrode 303*b* and may also be acted on at the same time by an electrode 303*a*. The electrode 303*b* can have a polarity such that it acts on the charges along the surface of the electrode 303*c* through capacitive action and causes increased charges to be distributed on the portion of the electrode 303C that is proximate to the electrode 303*b*. In examples, the electrode 303*a* can act capacitively on electrode 303*b* in a similar manner, and subsequently the action will appear on the electrode 303*c*. The electrode 303*a* in this example may be connected to the same electrical polarity as the electrode 303*c*, and the electrode 303*b* may be connected to the same polarity as the ion emitter 301.

In alternate examples, the electrode(s) sheathed in the dielectric can have multiple sections each comprising a conductor separated by the dielectric. Each of the conductors may have a separate voltage from a suitable high voltage source. The charge can be predominating in one direction (e.g., away from the exposed electrode). In such examples, the dielectric barrier discharge can tend to redistribute its density to favor the direction of the higher voltage conductor. The benefits of the alternate examples can include but are not limited to the functioning of a dielectric barrier discharge plasma actuator at relatively lower fluid medium speeds and with relatively higher efficiency, both of which can be a result of the longer field of influence for a given plasma actuator.

In examples, this application can be applied to the exterior of vehicles to influence the drag coefficient more effectively through the creation of a larger field of influence of the discharge and through the acceleration of the ionized particles in the plasma toward the higher density voltage conductor. This effect can also be made when differing dielectrics with different dielectric breakdown values or storage capacities. The extension of the plasma discharge can also be applied in other areas of industry such as the sterilization of food with greater efficiency due to the increased length of the discharge at a given voltage and any other area where dielectric barrier discharges are used.

In such a system, there may be a voltage source (e.g., a voltage source producing 500-500,000 volts) connected to an exposed conductive member for the production of ions in a fluid medium, and connected to the other terminal of the power source can be two or more conductive elements that separated from the ionizing terminal and which are held at different potentials from the ionizing terminal. The voltage potentials across the two or more conductive elements may be different from adjacent voltage potentials on the nearby elements so that the most leakage current (which takes the form of ions and plasma) across the capacitive arrangement tends to travel towards the highest potential which may be the furthest distance from the ion source. It can be understood that other methods can be used to change the potential on the conductive elements.

Another exemplary embodiment is a plasma actuator system that includes a source of ions (which may be an electrical ion emitter) and is configured to cause the ions to accelerate towards or away from the point of highest flux density depending on the polarity of the field with respect to the ion. The acceleration may influence the surrounding medium causing different fluid dynamic interplay between the surface and the surrounding medium to, for instance, reduce drag on the surface. It may also be used to cause increased accelerating in ion driven force production, as may be used in ionocraft.

In examples, because of the propensity for ionized electrons to stop at the point of highest acceleration, physical flow redirection can take place to avoid air stalling. Alternatively, in examples, the ions can be pulsed for short durations so that the ions can continue their flow after being accelerated. In other examples, the system can be configured to use the ion source and the point to which the ion accelerates around a curved surface in the manner of a Coanda effect thruster so that some of the energy is imparted to the surrounding medium to create a force on the object as a whole. This can be beneficial because the point at which the ions stall and become neutralized can be made to be out of the way of the surrounding fluid flow. In still other examples, various dielectric materials can be employed, each with different capacities to store energy in the dielectric lattices so that they can cause a change in the field distribution across the conductor and thereby influence the length and acceleration of the dielectric barrier discharge in a similar manner. These example are related to the system 300 of FIG. 3 since an acceleration of the ionized particle through a non-linear electric field can create thrust.

Further, plasma actuators disclosed herein can enable an increased extension of the length of the plasma discharge, a change in the acceleration of the medium, and/or a decrease in the tendency for an arc to form through dielectric breakdown of a dielectric barrier. In an example where one electrode has a curved shape while the other electrode has a flat plane, tradeoffs can be made with whether or not the lower dielectric material width is located near to or far from the other electrode, such as the initial imparted velocity and the rate of dielectric breakdown, peak voltage of a given apparatus, and the quench period. However, generally the configuration which imparts the maximum velocity with the minimum breakdown of the dielectric can be utilized.

In examples, a shape that is particularly well-suited to the dielectric depth or the conductor depth is when the electrode approaches the surface of the dielectric material as a portion of the function of the inverse of the distance from the edge of the first electrode squared (1/x^2). This shape can provide balance between the breakdown voltage, induced medium velocity, and the peak voltage of a given apparatus. It will be appreciated that a hyperbolic function or other functions may also be utilized. These examples are related to and/or can be implemented in the plasma actuator system 300 depicted in FIG. 3. The ion source can be connected to a voltage source and a dielectric can be between the emitter and the shaped electrode, which can cause the ion flow to preponderate towards the furthest point away from the emitter thereby lengthening the flow by accelerating the plasma towards the highest electric field density point.

In other examples, a source of ions, which may be a small diameter point that possesses a positive or a negative high voltage potential with a nearby electrode with substantially larger proportions, can be held at the opposite potential. The larger electrode can be shaped in such a way that there is an increased field density in the direction of the desired fluid movement, and it may be partially sheathed in a dielectric material, as depicted in FIG. 3. The differing sizes of electrodes can cause a non-uniform electric field to be created in which the ions emitted are accelerated. This can be applied in many ways, for instance via ion propulsion and/or plasma actuators.

In another aspect, the exemplary systems disclosed herein can be configured for tuning of the function of the deceleration of force over time for a given object undergoing a collision using a solid crash structure attached rigidly to a permanent or electromagnetic plunger of a solenoid actuator (which is in motion during a collision) and corresponding electrical coils (or stationary permanent magnets) with non-linear distributions of the power and/or windings creating a greater flux density towards one end of the axis of movement over the other. The tuning of this nonlinear field density function can allow for the maximum time to be attained for a given space and force of collision.

For example, in modern vehicles, a rigid and lightweight chassis structure may be ideal for vehicle dynamics. However, rigid crash structures and the incorporation of crumble zones may not be favorable in all circumstances for weight reasons, as well as cost, complexity of manufacturing, etc. The incorporation of impact reducing electrical solenoid coils, as are described here and in U.S. Provisional Patent Application No. 63/086,737 and U.S. patent application Ser. No. 17/492,412, which are each incorporated by reference herein, may take the place of these crash structures, creating lighter and lower cost alternatives to the crash structures and which may therefore be desirable in such applications. In particular examples, the power to the solenoid coil can be turned on during the impulse reduction and shut off afterwards for elimination of the secondary forces acting in the opposite direction (as exists in springs, for example).

Figure 4:
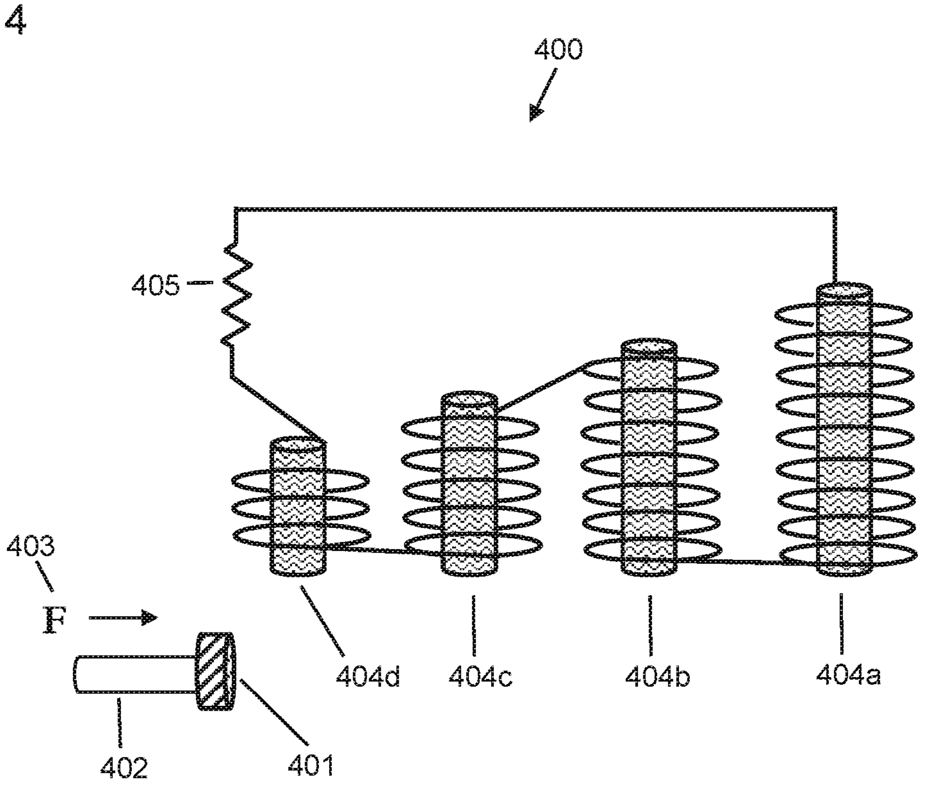
FIG. 4 is a schematic illustration of an exemplary system of force reduction through progressively increasing the power induced on the stationary members from the moving member through magnetic interaction according to the present disclosure.

An exemplary system 400 including an impulse reducing mechanism is shown in FIG. 4. FIG. 4 and illustrates progressive force dissipation. As shown in FIG. 4, in the system 400, a permanent magnet 401 is acted on by force(s) 403 through a connecting mechanism 402, which may be a rod or bar. The magnet 401 can be forced in the direction shown such that it is aligned with multiple inductors solenoids 404*a*, 404*b*, 404*c*, and 404*d* that are wound upon magnetically permeable cores along the pathway of the magnet 401. When the magnet 401 and the first inductor 404*d* align, and then again when the alignment is broken (due to the force(s) 403 acting on the rod 402), a discharge of power from inductor 404*d* can occur. This discharge can be transformed into heat through a large resistor 405 connected to the circuit formed through inductor 404*d*.

In examples where the circuits of all of the inductors are shared, attention can be given to the LC frequency so as to not accelerate the permanent magnet 401. The magnet 401 can progress forward (along the indicated direction) until it has aligned and misaligned itself with all four of the inductors 404*a*, 404*b*, 404*c*, and 404*d*. Each subsequent inductor of the inductors 404*a*, 404*b*, 404*c*, and 404*d* can have a capacity for larger energy dissipation than the prior one. Accordingly, the inductors may have varied resistance between otherwise identical inductors such that 404*d* has less resistance connected across it than 404*c*, 404*c* has resistance across it than 404*b*, and 404*b* has less resistance across it than 404*a*. This diagram depicts that variation occurring through the size of the inductive core with the inductor 404*d* being the smallest and the inductor 404*a* being the largest inductor. Through this gradually increasing energy dissipation, a gradual slowing can occur which may reduce the impulse force imparted from the object in motion.

With reference to the function of acceleration reduction of the foregoing example, it may be that a curve which contains the most progressive change in the slope of the deceleration force for increasing the time interval of a given impact event is an example of a rather ideal function to be used. To maintain this function, higher starting values of power density in the coil may need to be made use of when larger peak deceleration values are desired. Therefore, different impact forces may require different power densities in the solenoid for optimized deceleration and it may be advantageous to use a computerized system for analyzing and predicting impact events in order to tailor the function of the power density along the linear actuator to efficiently mitigate an impact event over the entire length of actuation of the coil through which the magnet travels. The computer may, for example, analyze the plunger's position and velocity, augmenting the required power to each circuit as the plunger's speed increases.

A circuit may also function without a computer when it is connected to an actuator producing a non-linear field and may have an open portion which becomes closed through a physical mechanism when an impact event occurs in a manner similar to a commutator, allowing the batteries connected to the circuit to send energy through the coils of the actuator. One or more turns of the actuator may have different proportions of current density relative to others of the turns depending on the speed at which the car is going. Sources of electrical current, such as batteries, may have switches which are computer controlled and are attached to each leg of the circuit. In examples, No power flow is provided to such a circuit until an impact event, and then, at the occurrence of an impact event, the power supplied can be in proportion to the speed and/or the projected impact force. In examples, capacitor banks or other sources of electrical current can be used in place of batteries.

In another aspect, a linear actuator can be configured to produce linear or physical oscillatory motion from asymmetrical flux distributions and can be constructed of at least two separately excited coils. The coils can be supplied by a source of three phase alternating current with a 90° phase lag between each adjacent coil circuit, although values greater than and less than 90° for the phase lag may also be useful for magnitude of the magnetic field gradient. Oscillatory motion can result from the coils which can cause a plunger (which may be magnetic, conductive, or ferromagnetic) to move towards the highest flux density at any given time and a position of the highest flux density may oscillatory due to the phase lag between the respective circuits. The exemplary oscillator can allow two oscillations of the plunger to be made for every cycle of the AC current. Thus, in such examples, a linear motor can be configured to create a reciprocating motion.

Figure 5:
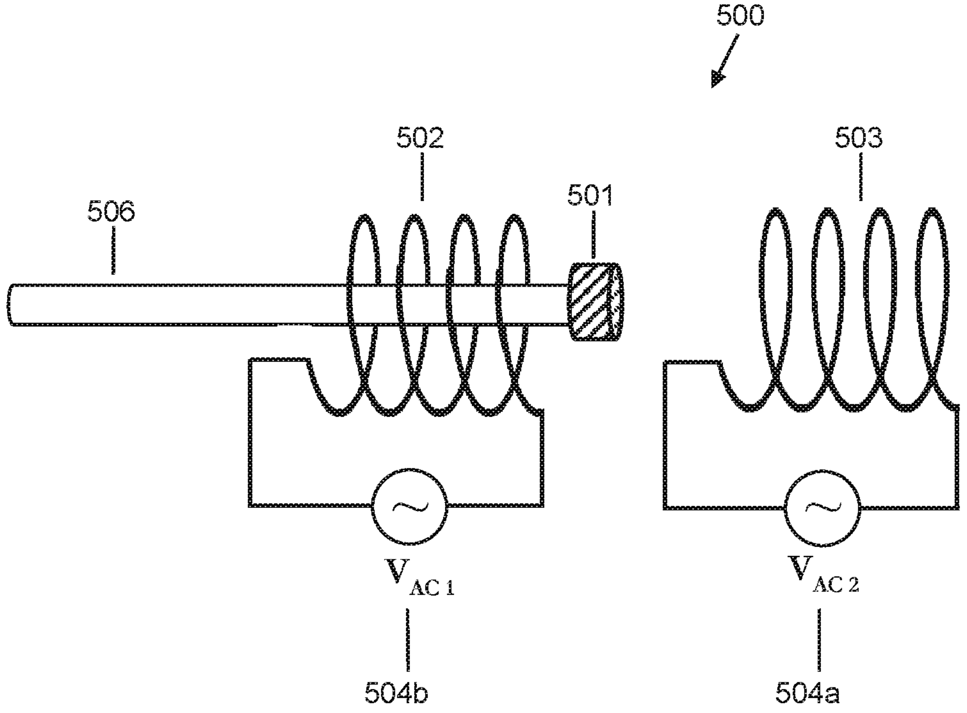
FIG. 5 is a schematic illustration of an exemplary plunger and circuit system, where the plunger moves between the two circuits depending on the magnitude of their respective power sources according to the present disclosure.

FIG. 5 illustrates an exemplary electromechanical oscillator system 500. The plunger is a permanent magnet 501 which can be acted on by both coils 502 and 503 simultaneously. When the coils 502 and 503 are in close proximity to each other, the plunger 501 can experience a force which can draw it towards whichever of the coils 502 or 503 has the greatest power flow. Power is respectively supplied to the coils 502 and 503 by the power sources 504*a* and 504*b*. A ninety degree phase lag between AC power supplied by power sources 504*a* and 504*a* may, for example, be employed in order to ensure a constantly shifting force vector on the plunger 501 which results in oscillating motion.

In another example, the circuit and system configuration of system 500 can be used as a differential power meter when two sources which are intended to be measured relative to each other are connected in place of the power sources 504*a* and 504*b*. In this example, a rod 506 may be connected to an analog meter so that movement of the plunger 501 results in a movement of the meter can indicate which of the two sources is dominant at any one time.

In other examples, the nonlinear field gradient can be incorporated in the otherwise standard linear motor configurations where motion can be a product of the magnetic field intensity acting at 90 degrees to the electric current. One benefit of incorporating the nonlinear field gradient in this configuration is enabling a nonlinear acceleration function of the moving object if desired. For example, a nonlinear acceleration function can be utilized to increase smoothness of motion by limitation or reduction of the jerking that may be caused by the moving object being suddenly accelerated at a constant value (as opposed to a gradually increasing non-constant acceleration). Such a reduction in jerking motion of an object can also lead to reduced noise from linear motor systems, among other benefits.

In examples, physical analogs of the aforementioned crash mitigation systems can be designed wherein reduction in momentum of the moving object in the system can be made as a nonlinear function over the length of actuation of the moving object. For example, a hydraulic system can include a small crash zone that is configured to displace a large amount of fluid into a thin reservoir with a moving plunger. In this example, the plunger can restrict fluid from bypassing it as the plunger travels down the length of a narrow tube. As the plunger moves down the tube from the displaced fluid of the impact event, physical or electrical brakes can be applied in a gradual and nonlinear way to lower the time impulse of the force. In other examples, purely physical and/or physical/electrical systems of this type can be made in a similar manner.

In other examples, impulse reduction through a progressive increase in resistance to motion can employ many forms of magnetic and electromagnetic topologies. Some exemplary configurations are discussed below. An object in motion which is configured to be progressively slowed may, for example, be one or more permanent magnets with their magnetic poles perpendicular to the direction of movement. As the magnet moves forward, it can move past multiple sets of electromagnetic coils which can have cores. These cores may form a "C" shape so as to have the magnetic circuits closed with the passage of the permanent magnet(s) which can enable an increased resistance to forward motion.

Progressive slowing of the object may take place by the object having one or more of the following configurations or methods: a plurality of separate permanent magnets on the moving member which may have a varying size/flux density, a variation in the proximity or size of the stationary electromagnetic coils, a variation in the size or composition of the core materials of the one or more electromagnetic coils, a varied load in the circuits connected to the electromagnetic coils, and/or variations in power supplied to the electromagnetic coils. Further, a consistently progressive and increasing resistance to motion can be utilized to lower the impulse, however, various profiles of force retardation can be accomplished in any one or a combination of the aforementioned configurations or methods, and/or by a computerized control method of supplying power to the electromagnetic coils in a specified proportion for a given force impulse reduction profile. In yet another example, the object in motion can be a magnetically permeable material and permanent magnets can assist or take the place of the electromagnetic coils that are stationary. Many combinations of variations of this system can be created within the scope of these examples.

In another aspect, configurations and methods of reducing the leakage of field flux through air between two adjacent magnets (with a non-linear flux distribution) by configuring a system such that one magnet has a peak magnetic flux density at the same position that the adjacent magnet a minimum magnetic flux density are described herein. For example, in a linear motor where multiple magnets are positioned next to each other (often with opposite polarities), flux leakage from a first magnet to a second magnet can be reduced, thereby increasing the radiated magnetic field above the face rather than to the stronger flux magnet. The lower flux density of the second magnet may be a portion of a magnet possessing a nonlinear flux density along its length (as specified in other examples described herein) so that a solenoid moving through the system can act on greater percentages of the total flux of each of the magnets and can reduce the amount of polarity switching needed with respect to a length thereof relative to a magnetic system which lacks such a configuration, such as an ordinary linear induction motor.

Figure 6:
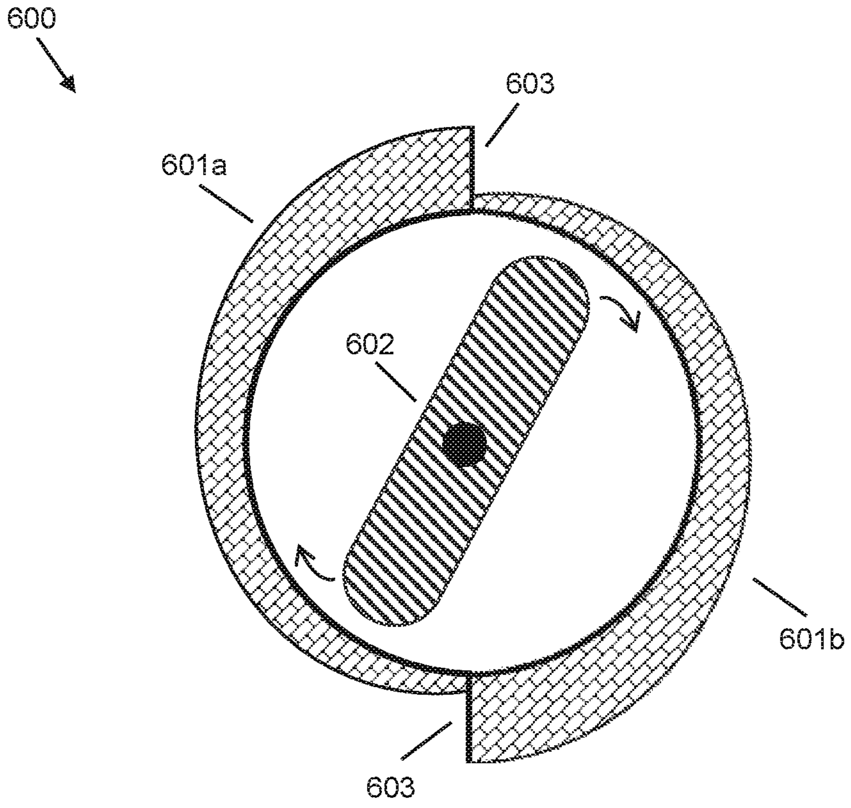
FIG. 6 is a schematic illustration of an exemplary electromagnetic motor, which incorporates magnets configured to provide an asymmetrical magnetic field profile along the direction of movement according to the present disclosure.

In examples, this method and configuration can also be utilized to reduce the impulse force caused by the binding of a coil moving past a magnet (or vice versa) during electric induction. In such examples, the core of the solenoid can have an oval geometry so that the magnetic field interacts with the inductor in a more progressive manner. For example, FIG. 6 depicts a system 600 including two permanent magnets which, when placed side by side, can have a decrease in flux leakage between the magnets as a product of the increase in distance between adjacent poles and the reluctance of magnetic flux to travel through the air (discussed further below).

In yet another aspect, a method and configuration for creating a suspension system which can be either partially or fully substituted for a conventional oil hysteresis or magneto-adaptive suspension and the spring by using nonlinear filed gradients acting on sources of magnetic fields is disclosed herein. For example, a suspension system can be formed out of a series of coils with independent circuits, thereby creating a nonlinear power distribution to each coil forming either the stationary (with respect to the suspended object) or both the stationary and moving parts of the suspension (depending on whether or not permanent magnets are used). As motion occurs, the moving part of the system (which may resemble the plunger in a linear actuator solenoid) can interact with the differing magnetic fields of the stationary part of the suspension.

In examples, multiple solenoids on the plunger can be independently interacting with the solenoids on the stationary part of the system which can advantageously also have a mechanism or sub-system which controls the power flow to each respective moving coil. In this way, various dampening and rebound rates can be formed by the mutual attraction and repulsion forces occurring between the moving and stationary parts of the system. A linear potentiometer (or other method or mechanism for linear motion tracking) can be connected to the moving shaft for active and predictive power flow alteration to the moving and the stationary parts of the system. These mechanisms or others can also be used to gauge whether the suspension is in the compression dampening or rebound dampening phases of motion.

In examples, a computer can use the data collected from these systems to alter the profile of the force absorption over the entire stroke by analyzing the rate of change of certain values. Portions of the stationary or moving system can be shut off partially or entirely in the case of part failure or in the case of intentional stroke reduction (such as in race applications or for power conservation over very smooth surfaces). Power flow to one or more solenoids can be varied with respect to the changing conditions which arise in a suspension system. When multiple permanent magnets or solenoids are placed on the moving part of the system, the suspension can act more consistently over a wider stroke than is possible with conventional dampers. Additionally, conventional oil and spring type dampers which are paired with the foregoing exemplary system of dampening may reduce the heat generated from hysteresis in the fluid, may be become adaptive, and may increase the service intervals. It can also allow for adaptive functionality without the use of a ferro-magnetic fluid as is commonly used today for adaptive suspension applications. The foregoing system can have a configuration similar or identical to that of system 200 shown in FIG. 2 (discussed above).

In another aspect, the methods and systems disclosed herein can use metal containing objects in linear or rotational actuators, which can cause motion through the use of inhomogeneous magnetic field density distributions. In these examples, the metal may have a Lorentz force which opposes that induced by the magnetic field in the metal object's vicinity.

In yet another aspect, a solenoid linear actuator where the solenoid is comprised of multiple individual circuit elements in such a way that allows portions of the solenoid to be deactivated is disclosed herein. As the plunger moves toward the center of the solenoid where it reaches magnetic equilibrium, portions of the solenoid can be switched off, for example, after the plunger comes in line with them or moves past these said portions. In this way, the plunger can find a point of equilibrium that is further along the path of motion as a result of there being less forces pulling it back towards its original starting position. In a system where a solenoid progressively turns off portions of the solenoid that the plunger has come into line with or passed the position of, there are less and less windings of a coil interacting with the plunger, and the force can be retarded as a result. A higher density of windings or greater power flow through these regions can mitigate the loss in forces as the plunger reaches further and further along the solenoid. In this way, a solenoid linear actuator can lengthen its stroke.

Figure 7:
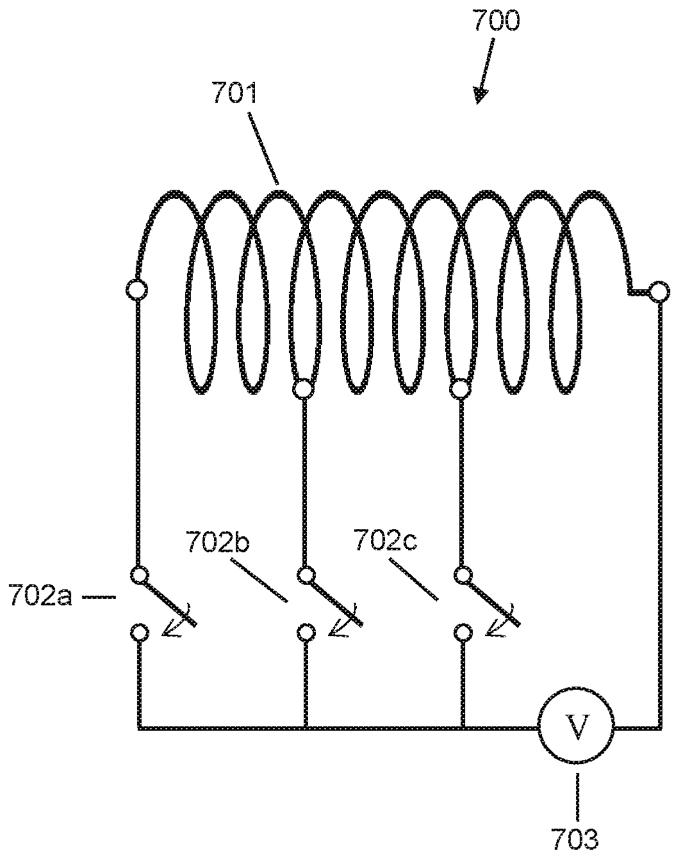
FIG. 7 is a schematic illustration of an exemplary electric hub motor containing magnets which have magnetic field distributions similar to the example in FIG. 6 along a curved axis.

An exemplary system 700 that can include multiple individual circuit elements is illustrated in FIG. 7. As can be seen in FIG. 7, a solenoid coil 701 which has a plurality of switches 702*a*, 702*b*, and 702*c* connecting the various branches of the solenoid 701 to a power source 703. As switches are turned on and off, corresponding portions of the solenoid 701 which have power flowing through them can act on a magnetic plunger. The position of a magnetic plunger can be changed through the altering of the position of these switches, thereby altering the active length of the solenoid coil.

In still another aspect, a method and a system for applying a pattern of a magnetic field density profile to an object (by using magnets made to have a varying flux density such as those described herein) which corresponds with a similar field on an opposite object is disclosed. In a repulsion example, these objects can be aligned so that the poles of the magnetic fields are pointed at each other with the same polarity, causing a repulsion force to act between them. In the repulsion example, the strongest magnetic field can align with the weakest magnetic field (by design) and can be generally repelled from moving out of this location due to the circumscribing field gradient having a greater repulsion force than the repulsion force of that particular location. Additional magnetic fields which are attracting can further help the two objects mesh together like the cogs of mechanical gears (where the objects may or may not be physically touching).

Figure 8A:
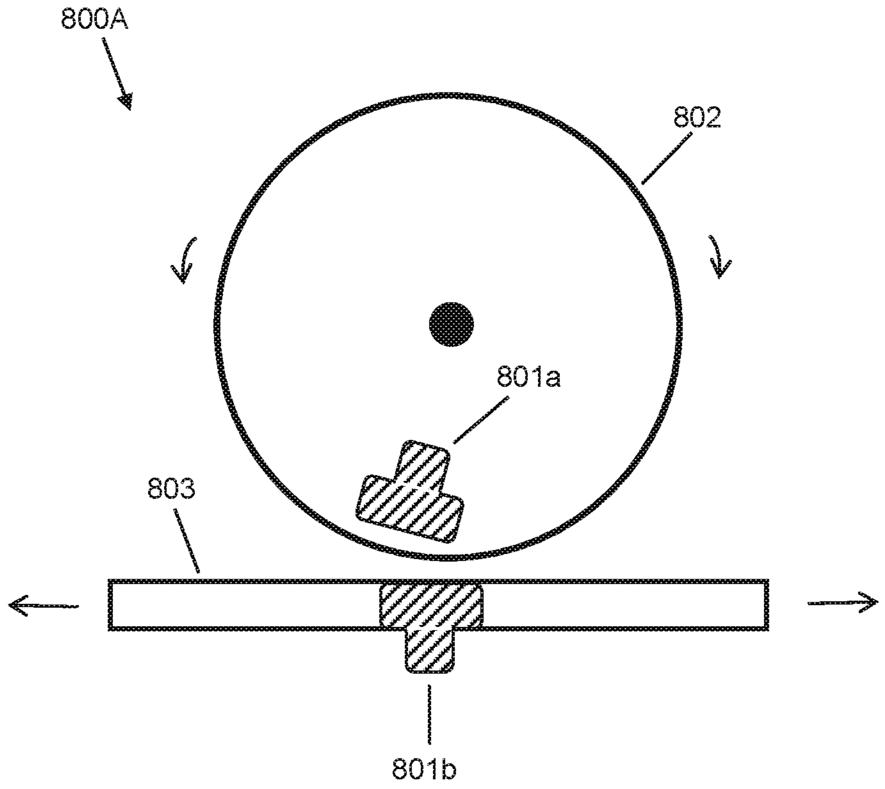
FIG. 8A is a schematic illustration of an exemplary magnet configured to produce an asymmetrical field distribution along its surface acting on another similar magnet in a system of motion according to the present disclosure.
Figure 8B:
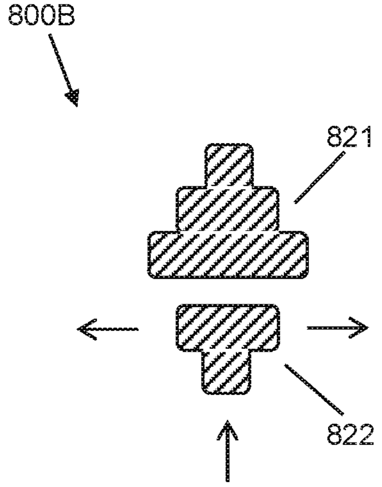
FIG. 8B is a schematic illustration of two exemplary magnets which are configured to create asymmetrical flux distributions acting on one another so as to align their peak magnetic field locations according to the present disclosure.

FIGS. 8A and 8B illustrate exemplary systems 800A and 800B configured for attraction where the points of highest flux density can be attracted to the corresponding points of highest flux distribution in the other object. In the examples of FIGS. 8A and 8B, alignment of two objects with respect to each other can be implemented in the pattern of flux distributions by having more than one peak flux density in a given pattern.

Specifically, FIG. 8A illustrates the use of magnets 801*a* and 801*b*, which are configured to produce an asymmetrical distribution of flux density along their surfaces due to the variations in their thickness. The magnet 801*a* is embedded in a rotating object 802, while the magnet 801*b* is embedded in a linearly moving track 803. Motion in one of these magnets (objects) 801*a* or 801*b* can cause motion in the other magnet due to the interacting fields of the magnets. The asymmetry of the flux density can provide additional properties of anti-slip due to the field gradient along the surface which can pull strongly magnetized objects towards the center. Centered peak magnetic flux density can be utilized in situations where the motion of the two moving members 802 and 803 may be reversed.

FIG. 8B illustrates that the system 800B includes a stationary permanent magnet 821 which can have an asymmetrical field distribution due to the variations in thickness along its length. The magnet 821 can act to center and stabilize a secondary (smaller) magnet 822. When the smaller object 822 gets out of alignment, the magnetic field gradient can pull it back to center. As illustrated, each of the exemplary systems 800A and 800B includes only two magnets, however, various numbers, configurations, and/or patterns of magnets disposed across both objects may be advantageous for certain applications in other examples.

In another aspect, a system can include a set of rotating objects which are in close vicinity to each other. In examples, the magnetic field density pattern can take the form of high, medium, and low field density gradients wrapping around a rotating object in a helical manner. The advantage these examples is that the field gradients can mesh more efficiently for a rotational application, as the magnetic fields are able to act on one another for longer than a corresponding symmetrical distribution (since there is not a reversal of force after the midpoint of the magnet).

Further, in such examples, the progressive nature of the forces can create less of a tendency for slip when two objects are rotating at different speeds. For example, two gears can possess helical field gradient distributions so that magnetic tracks of linearly increasing or decreasing magnetic flux density towards one end can be wound helically around a cylindrical shape. The second rotating object can have an identical pattern of magnets with a nonlinear field distribution made up of the either the same polarity, the opposite polarity, or a mixture of the two polarities as the original object, creating an analog of two mechanical gears cogging together when the two objects are in close proximity with one another (the two objects may or may not make physical contact). In this example, depending on the angle of the magnetic tracks wrapping around the object, there can be multiple tracks which are on top of each other at a given position on the face of the rotating object which can be engaged with the tracks on the other object. When greater rotational power levels are employed, both magnetic poles of each individual magnetic element can be used to mesh with the other object's magnetic tracks.

In this way, each of the magnetic poles of each respective magnetic element interact each time the magnetic tracks mesh with each other and, utilizing a portion or all of the flux density, the interacting magnets can produce and reduce the flux leakage. Field gradient pattern distributions may or may not be implemented (when both poles of each magnetic element are used) depending on the application. For example, spirally wound field pattern distributions may not be deemed necessary in low power scenarios. In other examples, ferromagnetic objects may be used to "lengthen" the permanent magnet's field by placing the ferromagnetic elements between two magnetic elements thereby creating a virtually longer magnet. One or more of the foregoing examples and configurations can be made with electromagnetic coils in place of the permanent magnets. Additionally, the magnetic field may act on a metallic object to produce similar effects.

In yet another aspect, examples where a rotating object possessing a "zig zag" pattern across its face composed of a strip of magnetic elements creating a nonlinear field density across the surface are disclosed herein. In examples, rotation of the object can cause linear back and forth actuation of a second object on a linear track (in which the object can slide but resist rotational movement) which follows the field gradient (towards the peak magnetic field) up and down the pattern as the object is rotated. An example such as this may act as a rotational to linear motion converter, as in, for example, the system 800A shown in FIG. 8A. In examples, when used in reverse, such a system can be a linear to rotational movement converter.

In examples, such systems can additionally be used jointly to synchronize two independently operated linear and rotational sources of movement. The forces generated by the rotational object can result in constant linear motion when the field gradient is patterned so as to have the peak field density situated in a distribution that resembles a sawtooth waveform. Lower magnetic field densities on either side of the peak field density can act to mitigate slip by driving the second moving object into an acceleration back in the direction of the peak field gradient once slip occurs. In examples, additional anti-slip properties can be created using a repelling arrangement of magnets next to the waveform which has an attracting flux density distribution. The objects within the system may be electromagnetic or permanent magnets, and they may act on objects of the same type or objects of a ferromagnetic or conductive nature. In examples, multiple linear actuators or rotational sawtooth configurations can be used in conjunction around the periphery of other objects for increased force production. In examples, the sawtooth waveform can be altered so that the acceleration forces can be tailored to a given application.

In yet another aspect, examples where an object which is being imparted to it linear motion in a single direction from a rotating source in cases where the linear motion on the object is meant to drive the object forward in a single direction continually are disclosed herein. For example, the sawtooth waveform referred to in the above example can be broken up into components which generally wrap around the rotating object in a spiral pattern. The components can interact with the object which is being imparted linear motion which has multiple conductive, electromagnetic, permanently magnetic, and/or ferromagnetic components that interact with the rotating object. An exemplary application in which this may be used is when a machine (or other object) needs to be driven deep in the ground.

In another example, rotation of the linearly translating object can result when the magnetic elements which are under the influence of the rotating object are wrapped around the circumference of the object in a spiral manner. Multiple magnetic elements on the linearly translating object may be spaced at an appropriate distance in order that they are imparted linear motion continually. These multiple elements may also be getting linear and rotational energy imparted to it simultaneously.

In yet another aspect, a method of monitoring and preventing slip events between two elements in co-motion with each other through the cogging of their magnetic fields is disclosed, and can be achieved, for example, via the above exemplary embodiments. In the process of the rotational to rotational motion or the rotational to linear motion force transference examples and methods described above, the amount of slip may be found to be proportional to the vibration which develops due to the field gradient pointing in a direction which is non-parallel with the axis of rotation. In examples, components of the force will therefore tend to create forcefully movement on the objects when slip occurs. This can be utilized as a method of monitoring the slip. For example, when slip is not desirable (as it would not be in most cases), monitoring of the arrangement of the field density can be done to determine whether it is oriented in the direction of movement or pointing in the opposite direction of movement. This may eliminate the vibration, but slip can still be monitored by measuring the transient accelerative forces on the object as these will now be the primary effect showing changes when slip occurs.

Another exemplary application for reducing slip between to moving objects can be accomplished by using non-linear magnetic fields to create a motor where both the stator and the rotor use non-linear magnetic flux distributions for the purpose of reducing slip. In examples, transient pulses of direct current (DC) can operate motors such as these or a commutated connection can be used. In other examples, alternating current (AC) may be used and the frequency can have a bearing on the speed of rotation. One advantage of the disclosed method and system over known systems may be that the use of the field gradient can prevent slip and/or cause synchronized motion. In other examples, the disclosed method and system may be used to accelerate objects, such as projectiles, in linear motors where the speed which the objects attain can be limited by the speed of the rotation of the magnetic gear and the slip.

In still other examples, a braking system can be made using a field gradient. In some examples, electromagnets can be used. Additionally or alternatively, permanent magnets can be used. In an exemplary embodiment, both the rotating object (to be braked) and the stationary object are electromagnetic. The rotating object in this example can have a position sensor which feeds a circuit controller which turns on and off the electromagnetic coils on the moving object such that there is a magnetic field gradient which points oppositely to the direction of travel. The stationary object, which in this example can be attracted towards the peak field density because of the opposite polarity, can cause a deceleration of the object. Further, the deceleration can be variable based on the stationary object's position in the field gradient (i.e., a greater deceleration can occur towards the peak field gradient).

It may not be advantageous to have active circuit elements in rotational motion, and therefore, in some examples, permanent magnets can be mounted on the rotating object and the rotational sensor can turn the stationary object on and off as the rotating field gradient passes it. Since this may cause vibration, multiple parallel gradients may be used which occur or are positioned at slightly different places along the circumference of the rotating object. It can be advantageous to use both poles of the field in order to minimize magnetic field leakage. In examples, for maximum stopping force, multiple stationary coils can be used and a plurality of sets of magnetic field gradients can be used. In examples, both poles of the field would can be utilized for maximum deceleration and efficiency. In examples, the field gradient can be used in repulsion for braking a rotating object, or can be used with a combination of repulsion and attraction. These examples may have applications in resistance-based systems, such as exercise machines.

Another application of the examples described herein for braking a rotating object can be where a conductive or ferromagnetic object is placed between two sets of magnetic field sources such that one source creates a magnetic flux gradient along the surface of the rotating object, which acts on the object between the two sources in a way that creates a field gradient within it, and the other source of a magnetic field acts on that field gradient. In examples, the coils can be configured such that both poles of a given coil are acting on two sides of the moving object which may, for example, be a thin disk-like object. In such examples, multiple parallel coils, each with a different power source or winding count from other nearby coils, can enable a field gradient to be formed.

Figure 9:
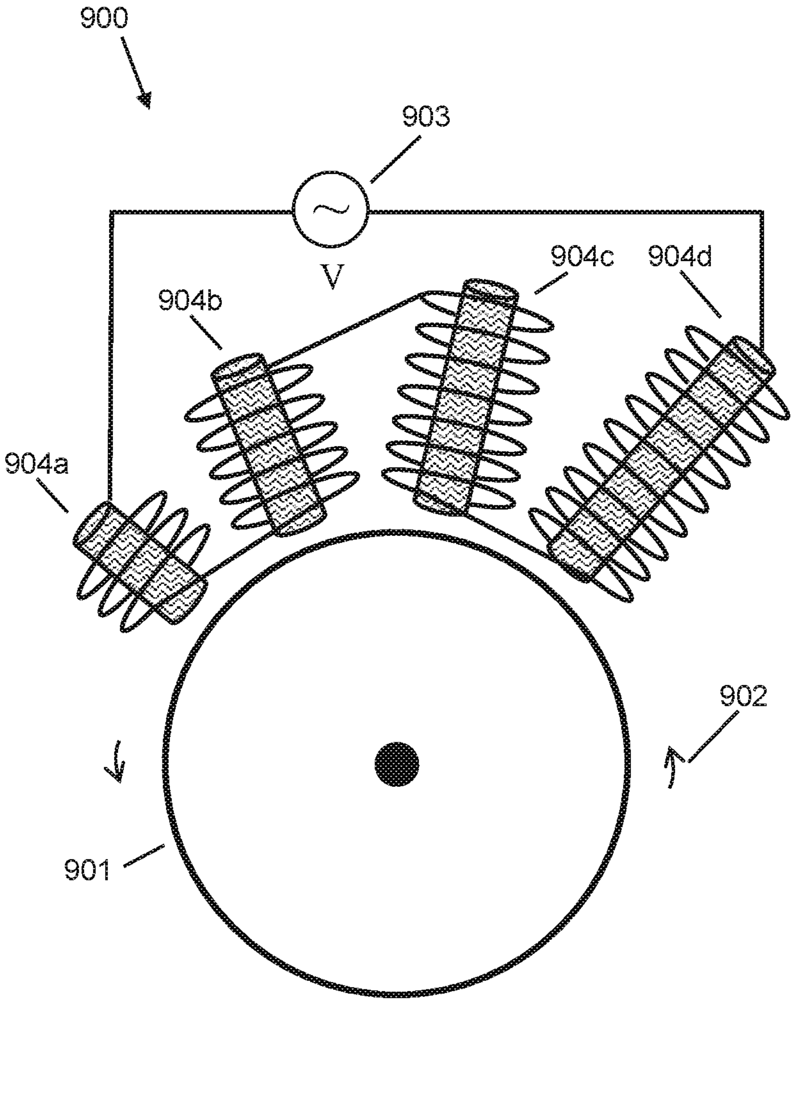
FIG. 9 is a schematic illustration of an exemplary system of braking a moving object through magnetic induction through the use of asymmetrical flux distributions.

FIG. 9 illustrates a system 900 including a rotating object 901, which may be ferromagnetic, and four solenoids 904*a*, 904*b*, 904*c*, and 904*d*. In examples, the four solenoids 904*a*,

904*b*, 904*c*, and 904*d* can each be slightly different such that the inductance or power flow of 904*d* is greater than that of 904*c*, the inductance or power flow of 904*c* is greater than that 904*b*, and the inductance or power flow of 904*b* is greater than that 904*a*. Further, in examples, the solenoids 904*a*, 904*b*, 904*c*, and 904*d* can each have a magnetically permeable core and can each be coupled to a source of power 903.

When the solenoids 904*a*, 904*b*, 904*c*, and 904*d* are energized by a current which changes over time (for example, an impulse current), they can magnetize the rotating object 901 as it comes into close vicinity to the changing magnetic field. The direction of rotation 902 is such that the highest inductance solenoid (e.g., the solenoid 904*d*) interacts with a given part of the rotating object 901 before the other solenoids (e.g., the solenoids 904*a*, 904*b*, and 904*c*) do. This can leave a residual magnetism in the object which will act to attract it towards the subsequent or next highest inductance solenoid, thereby showing the rotation of the object 901. As the rotation continues, an asymmetric distribution of flux density can be created by the solenoids 904*a*, 904*b*, 904*c*, and 904*d* (due to their varying inductance or power flow) and the same flux density profile can be created in the opposite polarity on the rotating object 901 (due to the residual magnetic effects of the magnetizing solenoids on the spinning ferromagnetic disc 901).

In examples, the two asymmetric magnetic flux densities can act to resist the separation of one another even further since the peak magnetic flux densities can attract each other and the peak flux density can be at one end of the system instead of the peak flux density acting centrally, as an ordinary electromagnet would. In doing so, the field gradient can cause further reduction in the speed of the rotating object 901 with respect to the stationary solenoids 904*a*, 904*b*, 904*c*, and 904*d*.

Under certain conditions it is possible for one magnetic field source to act on a conducting or ferromagnetic object in rotation (or which is generally in relative motion to the magnetic field source) where the field source can induce a nonlinear field gradient across the moving object. Further, the magnetic field source can act on the induced field in order to cause a retardation of motion. An example where such conditions may arise is when the moving object is ferromagnetic and the magnetic field is very strong. In this example, the magnetic field can leave residual magnetization in the ferromagnetic material which can tend to be attracted to the source of the magnetic field and can allow for the object to receive greater deceleration due to the residual field being attracted towards the highest density of the magnetic field from the source of the field.

Known eddy current brakes are not capable of operating at low speeds since the eddy currents develop with relative motion. Addition of a magnetic field gradient (as in the examples described herein) can cause a full stop braking event under a condition where the moving object is being acted upon either by a secondary magnetic source (which may have a time varying magnetic field that induces a field that can act on the primary magnetic field source) or by a singular primary magnetic field source with asymmetrical flux distribution (which itself may be a time varying field). Further, these fields may be strong enough to cause a residual magnetic field on the moving object which tends to accelerate towards the peak of the magnetic field gradient as the object moves away from this position. Furthermore, the foregoing examples can be implemented in the system 900 illustrated in FIG. 9.

In examples, permanent magnets can be manufactured include a field gradient by having a varying thickness along the length of the magnet where the magnetization is such that the thickness translates to the flux density of both poles and the thickness varies depending on the position along the length (see, for example; the magnet 101 shown in FIG. 1). Permanent magnets having such geometries may be advantageous as compared to conventional magnets since it is physically difficult to position two magnets near each other when similar poles are in close proximity due to their mutual repulsion of like fields. Additionally, issues may arise with the field uniformity when multiple conventional magnets are positioned near to each other. Magnets having the configuration of the magnet 101 may resolve such issues by providing a magnetic field gradient along the length of a singular magnet.

Alternatively, pyramid, wedge, or cone shaped magnets can be employed which have one polar face with a small cross-sectional area compared to the other polar face. Further, the core of the pyramid, wedge, or cone shaped magnet can be hollow or can include a void in the magnet which allows for the moving object to move freely within it while being subjected to the nonlinear magnetic field density. Variation in either or both of the thickness or the material quality/density can cause the field gradient. Additionally, variation in a thickness of a surface coating can result in a virtual magnetic field density distribution which can be acted on by coils acting on the object. It will be appreciated that the illustrated magnets (e.g., the magnets shown in FIGS. 1, 8A, and 8B) are merely exemplary geometries, configurations, and materials, and other exemplary magnets can include any combination of the foregoing features or other features disclosed herein that contribute to or create a field gradient for the magnet.

It will be appreciated that diamagnetic and paramagnetic materials can be used in the place of purely conductive or ferromagnetic materials in any of these embodiments and/or examples if it is used to influence the field gradient of the magnetic field.

In examples, a nonlinear field gradient can be incorporated into a known type of motor type, such as a brushless DC hub motor, to increase the amount of time which an individual field coil is able to act on the permanent magnets to produce motion (as in a system 600 illustrated in FIG. 6 and discussed below). In examples, this principle can be applied to various standard electromagnetic motors, and can result in the coil being able to be turned on for a longer period of time since the magnet itself is longer. For example, the coil may seek the highest flux density point in the magnetic field. Therefore, the coil can continue to accelerate when the lowest flux density point in the field passes the magnet until it aligns with the highest flux density point, which is when it may be advantageous for the field coil to be turned on. After the point of highest flux density passes, the coil can turn to switch the polarity and repel the permanent magnet. Further, the field gradient can extend to both sides of the point of highest density so that the repulsion force is able to act on a large portion of the magnet corresponding to portion of the magnet on which the attraction acted.

In examples, both poles of the magnet may have the foregoing feature. Alternatively, each pole of the magnet may have a field gradient distribution which becomes diminished as it extends toward (e.g., nearly all of the way to) a point of highest flux density of the opposite pole. Both of the foregoing examples can allow for wider action of the repulsion and attraction phases of the electromagnet for a given magnet or set of magnets. In examples where multiple magnets are employed in a motor, such as a brushless DC motor, implementing magnetic field gradient therein can allow for coils to be turned on for longer periods of time and can reduce switching losses (by the lower rate of the change in polarity of the magnets occurring while maintaining accelerative motion). The coils themselves can employ the magnetic field gradient by turning on adjacent coils with differing power density.

FIG. 6 illustrates an exemplary electric motor system 600 including permanent magnets 601*a* and 601*b* each configured for an asymmetric flux distribution along their face caused by a variation in thickness of the magnet having, for example, a continuously curved wedge shape. The electric motor system 600 further includes an armature 602 that can act on the magnets 601*a* and 601*b* for a comparatively longer time before it must be commutated (if it is, for example, a DC motor) as compared to a standard magnet that is not wedge shaped. This longer action is can be a result of the armature 602 rotating towards the point of alignment with the highest flux density which has been displaced. This means that less interruption due to commutation may be required. When driven by AC, the armature's rotational speed can be proportional to the frequency of alternation as the inward facing poles of magnets 601*a* and 601*b* are oppositely polarized. A reduced flux linkage can also exist between magnets 601*a* and 601*b* due to the large distance between the outer boundaries of the two magnets where they meet at points 603.

In examples where a series of permanent magnets or coils are spirally situated or disposed around the periphery of an object, magnetic fields from electromagnetic coils can turn on as the magnets approach and turn off as the magnets are directly in line with a point of peak flux density. In such examples, multiple coils can act on one or both poles of a single set of magnets in order to cause motion or rotation. Further, the electromagnetic coils can be made to rotate around permanent magnets in this manner. For examples with the lowest flux leakage and highest efficiency is desired, the electromagnetic coils can have ferromagnetic cores which may be laminated and/or the coils may be interconnected so that both poles of the coil act on both poles of the magnet in synchronicity. In examples, the magnets can be specifically configured or manufactured such that the range of influence is increased by altering the flux density and length of the magnets simultaneously.

In examples where two or more sources of electrical power are being metered, especially when the two sources are being compared for relative power distribution between them and it is desired for there to be no physical connection between the circuits, a meter can be constructed out of two or more separate circuits with a plunger that can be magnetic, ferromagnetic, paramagnetic, and/or metallic. The difference in the power distribution can cause motion of the plunger and can cause the plunger to come to rest in a location (a variable location) which can be used to meter the relative distribution of power between the respective circuits. For example, the electromechanical oscillator system 500 of FIG. 5 (discussed above) depicts a circuit that can be used as a differential power meter between two power sources 504*a* and 504*b*. Although not specifically shown, the rod 505 can be connected to an analog meter to display which of the two circuits is preponderating at a given moment.

In yet another aspect, an anti-slip magnetic screw is disclosed. For example, a magnetic screw can lack any physically engageable portion on the head and therefore cannot be unscrewed without the proper equipment. In examples, the screw can be made using the nonlinear distributions of magnetic field densities around or on top of the screw head. In such examples, the screw can require a certain magnetic field density to unscrew it. If slippage occurs, the screw may not be able to be removed due to the repelling force driving in the opposite direction as the attracting side. Once the required field is reached to overcome the friction of the screw, the poles of the coil/coils can latch to the screw and can have anti-slip properties due to the field gradient driving the screwdriver towards the peak field gradient. In examples, the foregoing magnetic screw system can have a configuration similar to the system 800B shown in FIG. 8B, except one of the magnets 821 or 822 can be an internal component or otherwise disposed on the head of the screw. In examples, both poles of the magnets can be used to provide better latching of one magnet onto the other. In examples, the magnetic flux gradients can act to resist slip while being rotated by having a tendency to move toward the peak flux density.

In other examples, a pattern of flux distributions can be formed between two objects such that other objects cannot produce the same force distribution profile. This profile of forces and flux can be used to create motion or measured in a way that allows for recognition of the two objects proximity. In this way a unique "key" can be formed using nothing other than varying flux density distributions between two objects. In examples, the foregoing unique key system can have a configuration similar to the system 800B of FIG. 8B except the complexity and the number of magnets can be adapted to suit the particular application.

In another aspect, an exemplary homopolar motor is disclosed. The homopolar motor can include a semicircular magnet with an increasing thickness toward one end which is polarized through the varying thickness. This configuration can create a magnetic field density which varies in proportion to the thickness of the magnet. An energized coil can act on the field gradient by accelerating either towards or away from the peak field density depending on whether attraction or repulsion is utilized. Once the coil reaches the point of highest field density, the coil can switch off, thereby creating a continuing motion. to the exemplary homopolar motor can have a configuration similar to the motor system 600 depicted in FIG. 6 and discussed above, except in the homopolar implementation the wedge shaped magnet 601*a* can span the entire diameter of the motor and magnet 601*b* can be excluded.

In another aspect, a field gradient can used for centering of an object. For example, when a square object is being centered over another square object, magnetic field gradients around the periphery of one object can interact with magnets placed on the second object in such a way that the second object is attracted into the proper (center) position automatically through the interaction of the magnetic forces involved. A similar method and configuration can be employed in a screw cap example, such that the cap can screw itself on to an enclosure when the magnetic field gradient causes rotation and attraction of the cap towards the base of the enclosure's threads. This may be especially useful in configurations where the thread is less than one full turn, and it is desirable that the lid has some resistance to unscrewing. The system 800B of FIG. 8B depicts one exemplary mechanism that can be used for stationary centering of an object using magnets with asymmetrical magnetic flux distributions. In examples, a reversal in the polarity of a solenoid which has been constructed or driven by a source of current to produce an inhomogeneous magnetic field can cause a reversal of the direction of motion of the plunger or moving object in a system, such as one or more of the exemplary systems disclosed herein. This can be an advantage over conventional solenoid designs.

In examples, a gradual motion of the plunger or moving object in a system (such as one or more of the exemplary systems disclosed herein) may be possible when a solenoid is made up of multiple portions, each portion connected to a different source of current which can be adjustable in its power level. When the plunger or moving object is under the influence of one of these circuits, nearby circuits can act on it. When the adjacent circuits are equally energized, the object in motion can move towards the center of the solenoids (which are being driven). If one of the circuits has a power bias or if one or more circuits is turned on or off, the object can be drawn towards a different point. Multiple separate circuits can, in this manner, control the directions of the object in motion or the plunger to any desired degree of accuracy, in some examples, using no other mechanical parts. In examples, springs or sources of tension can be added to the foregoing system where a motion that can return the object back to a certain location is desired, such as when it is desirable to save electrical energy.

In yet another aspect, a system can include a solenoid coil that can act as a spring when a magnetic object within the solenoid or the coil itself is acted upon by external forces. In examples, a virtual spring rate of the spring can be adjusted via adjustment a power level supplied to thereto. In examples, a point to which the magnetic object or the coil returns to in the absence of forces can be adjusted when the magnetic field produced by the solenoid is non-homogenous using the above described methods. Additionally, in examples, a spring (or a source of mechanical tension) can be used in conjunction with the system and the properties of the spring, such as the spring preload, can be influenced by either constantly or dynamically using either constant or dynamic changes in the power level or to the magnetic field distribution of the solenoid coil. in the foregoing exemplary system can have a configuration similar to the system 200 shown in FIG. 2 and discussed above.

In examples, a solenoid with a non-homogenous magnetic field distribution can be manufactured in such a way that multiple separate solenoids are placed end to end and can be driven by separate sources of power or can be driven by altering voltages or currents from the same source.

In examples, a solenoid with a non-homogenous magnetic field distribution can be manufactured using multiple wire taps in a method similar to the construction of an autotransformer with multiple taps along the length of a single winding. The wire taps can be used to connect the different portions of the coil to power sources, for which the respective power levels can be varied and/or can be different relative to others of the power sources. The wire taps can also allow for one or more portions of the circuit to be turned on or off by changing the position of the power source terminals using, for example, electrical switches. Further, batteries can be connected between each of the taps to create a magnetic distribution which may be non-homogenous (if desired). Furthermore, the system can be adapted to include current and voltage dividers, which may be paired with potentiometers for fine tuning or active direction control of a moving object in the system.

In known examples; a coil bobbin can be moved back and forth in the creation of a solenoid coil with a machine. In the examples disclosed herein, the timing of the switches in the direction of the bobbin in a con winding machine can be altered so that the windings are created with a higher distribution of them towards one end for the creation of a solenoid with a non-homogenous magnetic field distribution.

In examples, a power source can be constructed which is able to change its output power dynamically to drive a circuit in a solenoid in a system, such as the exemplary systems disclosed herein. In examples, multiple of these power sources can form a dynamic linear actuator or linear motor with a solenoid with a non-homogenous magnetic field distribution. In examples, a rate of change of the power can advantageously be minimized for a given trajectory of the magnet or the moving object in the system in order to mitigate the back-EMF effects of the solenoids.

Figure 10:
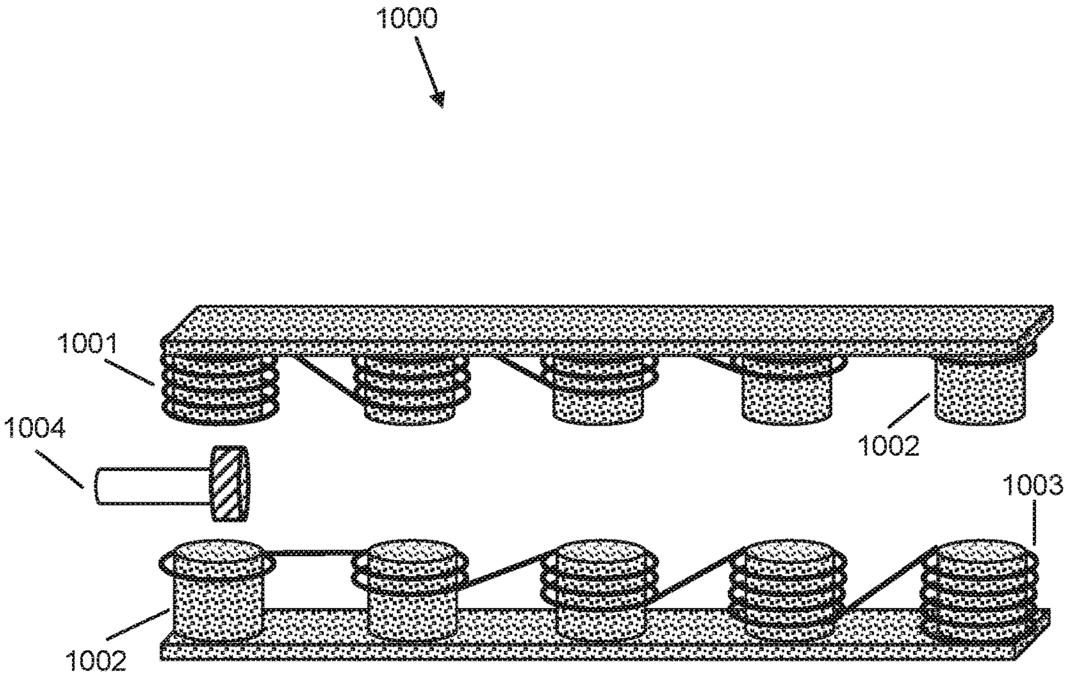
FIG. 10 is a schematic illustration of a linear actuator in which solenoids are configured to generate asymmetrical flux distributions that act on a plunger to produce motion according to the present disclosure.

FIG. 10 illustrates an exemplary axial flux actuator system 1000. As can be seen in FIG. 10, the system 1000 includes a permanent magnetic plunger 1004 that is acted on by two sets of windings 1001 and 1003. In the present example, each of the sets of windings 1001 and 1003 are wound around small nubs (cores) 1002 in a manner where each successive nub has a greater number of windings in order to create an asymmetrical magnetic flux density distribution with its peak flux acting in opposite directions on each side. In examples, the nubs 1002 can be filled with a magnetically permeable core so as to add to the inductance and/or the force. The polarity and the magnitude of the power supplied to each set of windings 1001 and 1003 will create a specified force profile, as well as a stopping point of the plunger 1004.

This actuation can take place over a flat or curved trajectory of motion due to the inherent flexibility of the design of the circuit. The motion of the magnet through the coils can be adjusted to create different shapes to fit different applications. Thus, in examples, actuator geometry of the system 1000 may be constructed along a curved or straight path for actuation or motion depending on adaptation to specific applications. In examples, the direction of motion can be perpendicular to the magnetic field lines as that may be the direction of the magnetic field gradient. Motion along this exemplary actuator can be accomplished with the benefit of allowing for the force of the moving plunger to be used for attaching a variety of loads, which can be accomplished more readily as compared to an ordinary or known solenoid (in which relatively longer means of transferring the force may be required). This exemplary linear actuator may also be advantageous over the conventional solenoid actuators in that it can allow introduction of a core material within the solenoids which may act to increase the force of the system.

In yet another aspect, a method of linking moving objects such as gears, belts, or other co-linear or counter rotating objects through the use of systems of magnets or coils with individual elements having magnetic fields which are interrelated in such a way that there is an inhomogeneous field density distribution is disclosed. This field distribution may be opposite to that of the other second object and may have identical magnetic poles all facing in the direction of the first object. The patterns variable field density across the surface causes the two objects to mesh in space in a way that is akin to the meshing of other mechanical gears, where the field density peaks and troughs of the of the first object's magnetic field are held in position with the relation to the other object.

In yet another aspect, a method of accelerating the ions produced from a ion emitting source over an electric field with an asymmetrical distribution towards or away from the point of highest flux density depending on the polarity of the field with respect to the ion is disclosed. Further, the use of metal objects instead of ferromagnetic objects, electromagnetic coils, or permanent magnets in systems of mechanical actuation whereby motion is caused by the inhomogeneous magnetic field density is disclosed. The patterning of a first object's magnetic field density in order to interact more efficiently with another second object with a similar magnetic field distribution is disclosed. A repulsive interaction is generally desirable to be the one used for minimum loss of energy. The two objects may be separated by air or another object. They do not need to be interlinked physically, they can be separated in space. The magnetic fields interact and the resistance of the second object to move out of synchronous position with the first object can be mitigated in any given direction by orienting the field density patterns to reflect the desired directional tendencies. For example, a chain may be constructed which may not touch the gears it interacts with and the field distribution pattern can be made so that slip along the length of the chain may be mitigated as well as the tendency for the chain to dislodge from the gear in either direction (i.e., self-centering on the magnetic gear). The benefits of this system and the others described above are that they can be silent in operation and they require a very minimal loss of energy in a given system. The patterned field may, for example, be employed on a solenoid driven linear actuator's stationary and moving components in order to cause a cessation of movement in order to hold the moving object in place.

In another aspect, a method of creating a clamping force on a piece of metal, ferromagnetic or otherwise, through magnetic induction through inducing different "patterned" field density distributions along a portion of the length of the object to be clamped is disclosed. The field between the two objects can result from the Lorentz force. The system can have a tendency to reduce slipping along the object to be clamped which comes from the induction which causes currents to flow in the object from high to low field gradient intensity zones. Opposite magnetic poles of induction can be used to create local current flow which acts on the magnets or coils in the clamping apparatus. Motion can also be imparted when the object metallic object is magnetized by, for example, other magnets or electric currents.

In still another aspect, a belt which has a patterned field on two parts of the belt which hold the belt in place once it is wrapped in a way that the patterned fields interact with one another patterned field which causes the belt to be held in place is disclosed.

In yet another aspect, a maximization of magnetic clamping force through the utilization of different field densities of attracting or repelling nature with each other, where repelling instances are mostly used when a space is desired to remain between the two objects, is disclosed. Ordinarily, magnetic clamping force would depend on the magnitude of the field alone. In examples disclosed herein, slipping between the clamping apparatus and the object to be clamped is mitigated by the accelerative forces which tend to center the two objects toward or away from the greatest magnetic field density. Similarly, slipping can be controlled by the magnitude of the magnetic gradient of a field in a given direction.

In still another aspect, a method of reduction of losses and wear on mechanical gears or tracks by additionally employing inhomogeneous magnetic fields between the gears or tracks which may be patterned in a way which has pertinence to the desired function in the given system (e.g., self-centering, anti-slip tendencies, etc.) is disclosed. This way the magnetic field and the teeth on the gears have a secondary method of causing relative motion which may be advantageous if one of them failed. For example, if a tooth on a gear broke, functionality of the gear would be compromised to a smaller lever when magnetic field gradients are employed to assist the gears action. Magnetic systems without the field density gradient can also be employed for this purpose.

Additional examples of the disclosed technology are enumerated below.

Example 1. An electromechanical system comprising: a first coil comprising a first set of windings; a second coil comprising a second set of windings, the second coil arranged on an axis with the first coil, the first set of windings and the second set of windings circumscribing the axis; and a plunger configured for movement along the axis; wherein the first coil is configured to receive power from a first power source, and the second coil is configured to receive power from a second power source; and wherein the electromechanical system is configured such that supplying a greater amount a power to one of the first coil or the second coil relative to the other of the first coil or the second coil results in generation of an asymmetrical flux distribution along the axis.

Example 2. The electromechanical system of any example disclosed herein, particularly example 1, wherein the electromechanical system comprises an electromechanical oscillator system.

Example 3. The electromechanical system of any example disclosed herein, particularly examples 1 or 2, wherein electromechanical system is configured such that the plunger will move towards the one of the first coil or the second coil having the greater amount of supplied power.

Example 4. The electromechanical system of any example disclosed herein, particularly examples 1-3, further comprising an analog meter in communication with the plunger, wherein the analog meter is configured to sense movement of the plunger along the axis.

Example 5. The electromechanical system of any example disclosed herein, particularly example 4, wherein the plunger comprises a magnetic portion coupled to a rod, the rod coupled to the analog meter.

Example 6. The electromechanical system of any example disclosed herein, particularly examples 4 or 5, wherein the electromechanical system is configured as a differential power meter, and is configured such that movement of the plunger sensed by the analog meter identifies one of the first power source or the second power source as a dominant power source.

Example 7. The electromechanical system of any example disclosed herein, particularly examples 1-6, wherein the first coil is configured to receive power from the first power source and the second coil is configured to receive power from the second power source such that there is ninety degree phase lag between power supplied by the first power source and the second power source, which thereby results in an oscillating motion of the plunger.

Example 8. The electromechanical system of any example disclosed herein, particularly examples 1-7, further comprising the first power supply and the second power supply, wherein the first power supply and the first coil comprise a first circuit, and the second power supply and the second circuit comprise a second circuit.

Example 9. A magnetic spring-like system comprising: a shaft having one or more magnetic plungers disposed therein; a first linear actuator arranged on an axis with the shaft, the first linear actuator configured to produce a force in a first direction along the axis; and a second linear actuator arranged on the axis with the first linear actuator and the shaft, the second linear actuator configured to produce force in a second direction along the axis, the second direction opposing the first direction.

Example 10. The magnetic spring-like system of any example disclosed herein, particularly example 9, wherein the magnetic spring-like system is configured to, in a first operation, produce the first force and the second force such that each is oriented toward the other, the first operation configured to generate a compression force on the shaft.

Example 11. The magnetic spring-like system of any example disclosed herein, particularly examples 9 or 10, wherein the magnetic spring-like system is configured to, in a second operation, produce the first force and the second force such that each is oriented away from the other, the first operation configured to generate a tension force on the shaft.

Example 12. The magnetic spring-like system of any example disclosed herein, particularly examples 9-11, wherein the first linear actuator is configured to receive power from a first power supply, and the second linear actuator is configured to receive power from a second power supply, and wherein the magnetic spring-like system is configured to enable selective provision of a greater amount of power to one of the first linear actuator or the second linear actuator relative to the other of the first linear actuator or the second linear actuator.

Example 13. The magnetic spring-like system of any example disclosed herein, particularly example 12, wherein the selective provision of the greater amount of power results in movement of the shaft, the movement of the shaft dependent on the amount of power and an orientation of the first force in the first direction relative to the second force in the second direction.

Example 14. The magnetic spring-like system of any example disclosed herein, particularly examples 12 or 13, further comprising a position feedback sensor and a computerized controller, the computerized controller in communication with the feedback sensor, the first power source, and the second power source, the computerized controller configured to enable control of a position of the shaft based at least on data received from the position feedback sensor and controlling a first power output of the first power source and controlling a second power output of the second power source.

Example 15. The magnetic spring-like system of any example disclosed herein, particularly example 14, wherein the computerized controller is further configured to proactively compensate for one or more of oscillations or dampening force via controlling the first power output of the first power source and controlling the second power output of the second power source.

Example 16. A magnet system configured for use in a linear actuator, the magnet system comprising: a conical magnetic body; and a cylindrical housing, the conical magnetic body disposed within the cylindrical housing; wherein the conical magnetic body is configured to produce an asymmetrical magnetic field.

Example 17. The magnet system of any example disclosed herein, particularly example 16, wherein the magnet system, when utilized in a linear actuator, is configured to have a longer stroke relative to a magnet of a same length as the magnet system and having a cylindrical configuration.

Example 18. The magnet system of any example disclosed herein, particularly examples 15 or 16, further comprising a non-magnetic material disposed in a space between an exterior surface of the conical magnet and an interior surface of the cylindrical housing.

Example 19. A rotational actuator comprising: a rotating object; a first pyramidal-shaped magnet embedded in the rotating object; a linear track; and a second pyramidal-shaped magnet embedded in the linear track; wherein movement of one of the linear track or the rotating object is configured to cause corresponding movement in the other of the linear track or the rotating object due to interaction of the first pyramidal-shaped magnet and the second pyramidal-shaped magnet.

Example 20. The rotational actuator of any example disclosed herein, particularly example 19, wherein each of the first pyramidal-shaped magnet and the second pyramidal-shaped magnet is configured to produce an asymmetrical flux density along a surface thereof.

Example 21. A magnet for use in an actuator, the magnet comprising a body having varying thickness over a length of the body, the varying thickness configured to produce an asymmetrical magnetic field distribution.

Example 22. A solenoid actuator comprising: a rotatable magnetic object; and a series of solenoids, each solenoid comprises a magnetically permeable core having winding disposed therearound; wherein each successive solenoid in the series having a greater number of windings relative to a prior solenoid in the series; and wherein provision of power to the solenoids is configured to result in rotation of the rotatable magnetic object.

Example 23. The solenoid actuator of any example disclosed herein, particularly example 22, wherein the series of solenoids are configured to generate an asymmetrical flux density when power is provided thereto.

Example 24. An axial flux actuator system comprising: a first set of windings comprising a first series of nubs each having windings disposed therearound, each nub in the first series of nubs having a greater number of windings relative to a prior nub in the first series; a second set of windings comprising a second series of nubs each having windings disposed therearound, each nub in the second series of nubs having a greater number of windings relative to a prior nub in the second series; and a magnetic plunger configured to move along an axis disposed between the first set of windings and the second set of windings; wherein the first set of windings have an opposing orientation relative to the second set of windings such that a first nub having a greatest number of windings in the first set of windings is disposed at a first end of the axial flux actuator system and a second nub having a greatest number of windings in the second set of windings is disposed at a second end of the axial flux actuator system; and wherein each of the first set of windings and the second set of windings is configured to produce an asymmetrical magnetic flux density when power is applied thereto.

Example 25. The axial flux actuator system of any example disclosed herein, particularly example 24, wherein a first amount of power supplied to the first set of windings can be varied relative to a second amount of power supplied to the second set of windings to control one or more movement, speed, or position of the magnetic plunger.

Example 26. A plasma actuator comprising: a fluid; an ion emitter immersed in the fluid; and a series of polarized electrodes immersed in the fluid; wherein the plasma actuator is configured such that electrodes in the series of electrodes interact with adjacent ones of the electrodes to create an asymmetrical charge distribution at each electrode.

Example 27. An electric motor system comprising: a first magnet having a continuously curved wedge shape having a first end with a greatest thickness and a second end with a smallest thickness; a second magnet having a continuously curved wedge shape having a first end with a greatest thickness and a second end with a smallest thickness; and an armature; wherein the first end of the first magnet is aligned with the second end of the second magnet and the second end of the first magnet is aligned with the first end of the second magnet such that the first magnet and the second magnet encircle the armature.

Example 28. A multi-circuit solenoid comprising: a coil comprising a plurality of windings; a plurality of switches, each of the plurality of switches disposed on a circuit connected to at least one of the windings and configured to be transitioned between a closed state and an open state; and a power source configured to provide power to a closed circuit formed by a distal end of the windings and a circuit corresponding to a location of a closed state switch.

Example 29. An impulse reducing system comprising: a series of solenoids, each solenoid comprises a core having winding disposed therearound; wherein each successive solenoid in the series having a greater number of windings relative to a prior solenoid in the series; and wherein provision of power to the solenoids is configured to result in gradual increase of energy dissipation and a gradual slowing of a magnetic object in motion.

Example 30. A method comprising using any of the systems disclosed in examples 1-29 to control a position, a stroke length, a speed, or stopping of a magnetic member.

Example 31. A system of force production and mitigation wherein forces impressed on one or more actuators in the system through a connecting member are augmented through their action so as to control overall forces acting on the moving member.

Example 32. A method of designing and constructing permanent magnets with asymmetrical flux distributions for use in actuators in order to increase the stroke relative to a permanent magnet of ordinary construction.

Example 33. A method of force reduction of a moving member through the progressively increasing dissipation of energy along a pathway of travel of the moving member.

Example 34. A linear actuator wherein a magnetic axis of one or more solenoids is disposed at ninety degrees from the axis of movement of an object, while a magnetic field gradient aligned with the axis of movement, the one or more solenoids comprising magnetically permeable cores for increased force acting on the object.

Any feature(s) of any example(s) disclosed herein can be combined with or isolated from any feature(s) of any example(s) disclosed herein, unless otherwise stated. Further, in view of the many possible embodiments to which the principles of the disclosure may be applied, it should be recognized that the illustrated embodiments are only examples and should not be taken as limiting the scope of the disclosed subject matter or the claims.

We claim:

1. An electromagnetic motor comprising:

a permanent magnet having a wedge-shaped body that tapers from a first end portion having a first thickness to a second end portion having a second thickness, wherein the first thickness is greater than the second thickness;

an armature comprising at least one coil, wherein the at least one coil is configured to, when energized, generate a magnetic field, and wherein the armature is configured to rotate relative to the permanent magnet when the at least one coil is energized;

wherein the wedge-shaped body of the permanent magnet produces an asymmetrical magnetic flux distribution that has a higher flux density at the first end portion and a lower flux density at the second end portion; and wherein the magnetic field of the at least one coil of the armature, generated when the at least one coil is energized, interacts with the asymmetrical magnetic flux distribution to drive rotation of the armature as the at least one coil moves toward the higher flux density at the first end portion and away from the lower flux density at the second end portion.

2. The electromagnetic motor of claim 1, wherein the wedge-shaped body comprises a continuously curved surface from the second end portion to the first end portion.

3. The electromagnetic motor of claim 1, wherein the permanent magnet is a first permanent magnet and the electromagnetic motor further comprises a second permanent magnet; and wherein the second permanent magnet comprises a wedge-shaped body that tapers from a first end portion having a third thickness to a second end portion having a fourth thickness, wherein the third thickness is greater than the fourth thickness.

4. The electromagnetic motor of claim 3, wherein the first permanent magnet and the second permanent magnet are in an opposing orientation wherein the first end portion of the first permanent magnet is adjacent the second end portion of the second permanent magnet and the first end portion of the second permanent magnet is adjacent the second end portion of the first permanent magnet.

5. The electromagnetic motor of claim 4, wherein the opposing orientation of the first permanent magnet and the second permanent magnet is configured to reduce magnetic flux leakage.

6. The electromagnetic motor of claim 3, wherein the armature is configured to rotate about an axis, and wherein the first permanent magnet and the second permanent magnet are each continuously curved such that the first and second permanent magnets together surround the armature and are coaxial with the axis.

7. The electromagnetic motor of claim 1, wherein the armature comprises one of a ferromagnetic material, a permanent magnet, or a conductive material.

8. The electromagnetic motor of claim 1, wherein the first thickness is a greatest thickness of the permanent magnet and the second thickness is a smallest thickness of the permanent magnet.

9. An electromagnetic motor comprising:

at least one permanent magnet producing an asymmetrical magnetic flux distribution along a face of the at least one permanent magnet, the asymmetrical magnetic flux distribution having a highest flux density region displaced toward a first end portion of the at least one permanent magnet and a lowest flux density region displaced toward a second end portion of the at least one permanent magnet, the second end portion opposing the first end portion; and an armature comprising at least one coil, wherein the at least one coil, when energized, is configured to generate a magnetic field that interacts with the asymmetrical magnetic flux distribution of the at least one permanent magnet to drive rotation of the armature relative to the at least one permanent magnet.

10. The electromagnetic motor of claim 9, wherein the at least one permanent magnet has a wedge-shaped body having a greatest thickness at the first end portion of the at least one permanent magnet and a smallest thickness at the second, opposing end portion of the at least one permanent magnet.

11. The electromagnetic motor of claim 10, wherein the wedge-shaped body comprises a continuously curved surface from the second end portion to the first end portion.

12. The electromagnetic motor of claim 9, wherein the at least one permanent magnet comprises a first permanent magnet and a second permanent magnet, wherein each of the first permanent magnet and the second permanent magnet has a wedge-shaped body having a greatest thickness at its first end portion and a smallest thickness at its second, opposing end portion.

13. The electromagnetic motor of claim 12, wherein the first permanent magnet and the second permanent magnet are in an opposing orientation wherein the first end portion of the first permanent magnet is adjacent the second end portion of the second permanent magnet and the first end portion of the second permanent magnet is adjacent the second end portion of the first permanent magnet.

14. The electromagnetic motor of claim 12, wherein the armature is configured to rotate about an axis, and wherein the first permanent magnet and the second permanent magnet are each continuously curved such that the first and second permanent magnets together surround the armature and are coaxial with the axis.

* * * * *